US011959613B2

(12) United States Patent
Sato et al.

(10) Patent No.: US 11,959,613 B2
(45) Date of Patent: Apr. 16, 2024

(54) LIGHT SOURCE UNIT OF VEHICLE LIGHTING SYSTEM AND VEHICLE LIGHTING SYSTEM

(71) Applicant: ICHIKOH INDUSTRIES, LTD., Isehara (JP)

(72) Inventors: Yoshiro Sato, Kanagawa (JP); Hironari Zushi, Kanagawa (JP)

(73) Assignee: ICHIKOH INDUSTRIES, LTD., Isehara (JP)

( * ) Notice: Subject to any disclaimer, the term of this patent is extended or adjusted under 35 U.S.C. 154(b) by 0 days.

(21) Appl. No.: 17/644,534

(22) Filed: Dec. 15, 2021

(65) Prior Publication Data

US 2022/0107074 A1 Apr. 7, 2022

Related U.S. Application Data

(63) Continuation of application No. 17/252,975, filed as application No. PCT/JP2019/024710 on Jun. 21, 2019, now Pat. No. 11,215,335.

(30) Foreign Application Priority Data

Jun. 21, 2018 (JP) ................................ 2018-118182
Jun. 21, 2018 (JP) ................................ 2018-118212

(51) Int. Cl.
*F21S 43/16* (2018.01)
*F21S 43/14* (2018.01)
(Continued)

(52) U.S. Cl.
CPC ............... *F21S 43/16* (2018.01); *F21S 43/14* (2018.01); *F21S 43/239* (2018.01); *F21V 7/26* (2018.02); *F21V 9/38* (2018.02)

(58) Field of Classification Search
CPC .......... F21S 43/14; F21S 43/16; F21S 43/239; F21S 43/245; F21S 43/247; F21S 43/26; F21S 43/255; F21V 7/26; F21V 9/38
See application file for complete search history.

(56) References Cited

U.S. PATENT DOCUMENTS 5,931,566 A 8/1999 Fraizer
6,908,220 B2 6/2005 Misawa
(Continued)

FOREIGN PATENT DOCUMENTS

CN 101056781 A 10/2007
CN 103994387 A 8/2014
(Continued)

OTHER PUBLICATIONS

English Translation of JP 200906064 (Year: 2009).*
(Continued)

*Primary Examiner* — Zheng Song
(74) *Attorney, Agent, or Firm* — Oblon, McClelland, Maier & Neustadt, L.L.P.

(57) ABSTRACT

A light source unit of a vehicle lighting system includes: a light source to emit excitation light; a light generating unit including a luminescent layer to emit generation light by being irradiated with the excitation light and a holding member holding the luminescent layer; and a lens member to output generation light from the luminescent layer toward the front, with the light source unit mounted on the vehicle.

12 Claims, 16 Drawing Sheets

(51) Int. Cl.
*F21S 43/239* (2018.01)
*F21V 7/26* (2018.01)
*F21V 9/38* (2018.01)

(56) References Cited

U.S. PATENT DOCUMENTS

| | | | | |
|---|---|---|---|---|
| 7,686,489 | B2 | 3/2010 | Ajiki et al. | |
| 10,309,598 | B2 | 6/2019 | Matsunami et al. | |
| 2006/0012307 | A1 * | 1/2006 | Bucher | G09F 21/04 315/77 |
| 2007/0171674 | A1 | 7/2007 | Deutsch | |
| 2007/0188102 | A1 | 8/2007 | Lee et al. | |
| 2008/0013335 | A1 * | 1/2008 | Tsutsumi | F21V 9/06 362/545 |
| 2010/0237373 | A1 * | 9/2010 | Yamazaki | H10K 50/13 257/E33.013 |
| 2011/0216554 | A1 | 9/2011 | Hattori et al. | |
| 2012/0007130 | A1 * | 1/2012 | Hoelen | H01L 33/644 257/E33.061 |
| 2012/0106127 | A1 | 5/2012 | Hattori | |
| 2012/0314411 | A1 * | 12/2012 | Nagasaki | F21V 3/08 362/231 |
| 2014/0118999 | A1 * | 5/2014 | Lin | F21K 9/62 362/217.05 |
| 2015/0062946 | A1 | 3/2015 | Fukai et al. | |
| 2015/0085467 | A1 * | 3/2015 | Tsumori | F21S 43/255 362/84 |
| 2015/0345745 | A1 * | 12/2015 | Asadi | F21V 29/70 257/98 |
| 2016/0003440 | A1 * | 1/2016 | Wataya | C09K 11/675 313/503 |
| 2016/0102833 | A1 * | 4/2016 | Ito | F21S 43/243 362/311.06 |
| 2017/0198874 | A1 | 7/2017 | Matsunami et al. | |
| 2018/0045881 | A1 | 2/2018 | Gotou et al. | |
| 2018/0160095 | A1 | 6/2018 | Lee | |
| 2018/0266638 | A1 | 9/2018 | Nishimura | |
| 2018/0372290 | A1 * | 12/2018 | Jo | F21S 41/176 |
| 2019/0024854 | A1 | 1/2019 | Annen | |
| 2019/0113197 | A1 | 4/2019 | Kamiya | |
| 2020/0088374 | A1 | 3/2020 | Kogure | |

FOREIGN PATENT DOCUMENTS

| | | | | |
|---|---|---|---|---|
| CN | 206449462 | U | 8/2017 | |
| DE | 10 2011 081 919 | A1 | 2/2013 | |
| DE | 10 2014 203 245 | A1 | 8/2015 | |
| EP | 3355664 | A1 | 8/2018 | |
| JP | 2000-326785 | A | 11/2000 | |
| JP | 2002-100216 | A | 4/2002 | |
| JP | 2006-58394 | A | 3/2006 | |
| JP | 2006-73202 | A | 3/2006 | |
| JP | 2007-220671 | A | 8/2007 | |
| JP | 2008-21578 | A | 1/2008 | |
| JP | 2008-021578 | A | 1/2008 | |
| JP | 2008-123969 | A | 5/2008 | |
| JP | 2008-163809 | A | 7/2008 | |
| JP | 2009-206064 | A | 9/2009 | |
| JP | 2011-187285 | A | 9/2011 | |
| JP | 2015-50148 | A | 3/2015 | |
| JP | 2017-92010 | | 5/2017 | |
| JP | 2017-92010 | A | 5/2017 | |
| JP | 2018-067491 | A | 4/2018 | |
| JP | 2018-67491 | A | 4/2018 | |
| WO | 2013/114747 | A1 | 8/2013 | |
| WO | WO 2014161941 | * | 10/2014 | B60Q 1/26 |
| WO | 2016/148005 | A1 | 9/2016 | |
| WO | WO 2017/095200 | A1 | 6/2017 | |
| WO | WO 2017/164328 | A1 | 9/2017 | |

OTHER PUBLICATIONS

Extended European Search Report dated Jan. 4, 2022 in European Patent Application No. 19823152.4, 17 pages.

Combined Chinese Office Action and Search Report dated Mar. 1, 2022 in Chinese Patent Application No. 201980040605.4 (with unedited computer generated English translation), 15 pages.

International Search Report issued in PCT/JP2019/024710 dated Sep. 10, 2019.

International Search Report issued in PCT/JP2020/016207 dated Jun. 16, 2020.

* cited by examiner

LIGHT SOURCE UNIT OF VEHICLE LIGHTING SYSTEM AND VEHICLE LIGHTING SYSTEM

CROSS-REFERENCE TO RELATED APPLICATIONS

This application is a continuation of U.S. application Ser. No. 17/252,975 filed Dec. 16, 2020, the entire contents of which is incorporated herein by reference. U.S. application Ser. No. 17/252,975 is a 371 of International Application No. PCT/JP2019/024710 filed Jun. 21, 2019, and claims the benefit of priority from prior Japanese Application No. 2018-118182 filed Jun. 21, 2018, and Japanese Application No. 2018-118212 filed Jun. 21, 2018.

FIELD

The present invention relates to a light source unit of a vehicle lighting system and a vehicle lighting system.

BACKGROUND

A typical vehicle lighting system with a function of signal lighting, such as tail lights, includes a light source unit. The light source unit includes a light source, a plate-like light guide lens to guide light from the light source, and a lens member to output light, guided by the light guide lens, toward the front of the vehicle (for example, see Patent Literature 1).

CITATION LIST

Patent Literature

Patent Literature 1: JP 2017-92010 A

SUMMARY

Technical Problem

In recent years, in a light source unit of vehicle lighting systems, a configuration that provides surface emitting by using an organic light-emitting diode as a light source has been sought. However, the organic light-emitting diode is a structure in which an electrode, an organic layer, and another electrode are laminated on a substrate, and a current flowing between the electrodes causes electrical deterioration when electroluminescence occurs, which makes the light source less reliable. In addition, the manufacturing cost of an organic light-emitting diode is high. Such a light source unit is therefore desired that can provide surface emitting while securing reliability of the light source and reducing the cost.

The present invention has been made from the above point of view, and has an object to provide a light source unit of a vehicle lighting system and a vehicle lighting system that are capable of providing surface emitting while securing reliability of the light source and reducing the cost.

Solution to Problem

A light source unit of a vehicle lighting system according to the present invention includes a light source, a light generating unit, and a lens member. The light source emits excitation light. The light generating unit includes a luminescent layer to emit generation light by being irradiated with the excitation light and a holding member that holds the luminescent layer. The lens member outputs the generation light from the luminescent layer toward a front, with the light source unit mounted on a vehicle.

In the light source unit of a vehicle lighting system, the luminescent layer may be made of an organic material.

In the light source unit of a vehicle lighting system, the light generating unit may include a sealer that transmits the excitation light and the generation light and seals the luminescent layer.

In the light source unit of a vehicle lighting system, the holding member may transmit the excitation light and is in a form of a plate having flat portions at front and back surfaces, the luminescent layer may be formed on at least one of the flat portions at the front and back surfaces of the holding member, and the light generating unit may have the flat portion on which the luminescent layer is formed and which is disposed on a front side, with the light source unit mounted on the vehicle.

In the light source unit of a vehicle lighting system, the holding member may be capable of transmitting the generation light, and the luminescent layer may be formed on each of the flat portions at the front and back surfaces of the holding member.

In the light source unit of a vehicle lighting system, the holding member may have a side surface that connects the flat portions at the front and back surfaces with each other, and the light source may have a light-emitting surface emitting the excitation light and disposed facing the side surface.

In the light source unit of a vehicle lighting system, the holding member may have a plurality of the side surfaces, and one of the side surfaces different from the side surface facing the light-emitting surface may have a light diffusing portion to diffuse the excitation light.

In the light source unit of a vehicle lighting system, the holding member may be capable of transmitting the generation light, and the light generating unit may have a plurality of the holding members disposed with the flat portions facing each other.

In the light source unit of a vehicle lighting system, a plurality of the luminescent layers included in a plurality of the light generating units may be disposed in respective different regions when viewed from the front.

In the light source unit of a vehicle lighting system, the luminescent layers included in the light generating units may be in a form of a frame a dimension of which is different from one another when viewed from the front.

In the light source unit of a vehicle lighting system, the luminescent layer may emit red light, as the generation light.

In the light source unit of a vehicle lighting system, the lens member may transmit red light and absorbs light different from red light.

A vehicle lighting system according to the present invention includes the light source unit of a vehicle lighting system.

A light source unit of a vehicle lighting system according to the present invention includes a light source, a light generating unit, and a lens member. The light source emits excitation light. The light generating unit includes a luminescent layer configured to emit generation light by being irradiated with the excitation light, a reflective layer disposed on a back side of the luminescent layer with the light source unit mounted on a vehicle and configured to reflect the generation light toward a front with the light source unit mounted on a vehicle, a semi-transmissive reflective layer disposed at a location that is on a front side of the luminescent layer and is opposite to the reflective layer with the luminescent layer interposed, with the light source unit mounted on a vehicle, and configured to transmit a part of the generation light and to reflect another part of the generation light toward a back with the light source unit mounted on a vehicle, and a holding member that holds the luminescent layer, the reflective layer, and the semi-transmissive reflective layer. The lens member is disposed on a front side of the light generating unit and outputs the generation light passing through the semi-transmissive reflective layer toward the front.

In the light source unit of a vehicle lighting system, the luminescent layer may be made of an organic material.

In the light source unit of a vehicle lighting system, the luminescent layer may be in a form of a frame when viewed from the front.

In the light source unit of a vehicle lighting system, the light source may be disposed under the luminescent layer with the light source unit mounted on a vehicle.

In the light source unit of a vehicle lighting system, the reflective layer may be curvedly projecting toward the back.

In the light source unit of a vehicle lighting system, the luminescent layer may emit red light, as the generation light.

In the light source unit of a vehicle lighting system, the lens member may transmit red light and absorbs light different from red light.

A vehicle lighting system according to the present invention includes the light source unit of a vehicle lighting system.

Advantageous Effects of Invention

According to the present invention, a light source unit of a vehicle lighting system and a vehicle lighting system are provided that are capable of providing surface emitting while securing reliability of the light source and reducing the cost.

DESCRIPTION OF EMBODIMENTS

Embodiments of a light source unit of a vehicle lighting system and a vehicle lighting system according to the present invention will now be described with reference to the accompanying drawings. The embodiments are not intended to limit the present invention. Components described in the embodiments include those that can be easily replaced by the skilled person and that are substantially the same. In the following description, various directions, such as a forward-rearward direction, an up-down direction, a left-right direction, indicate directions determined with a light source unit of the vehicle lighting system mounted on the vehicle and determined with a driver on board the vehicle facing the direction of travel of the vehicle. In the embodiment, the up-down direction is parallel to the vertical direction, and the left-right direction indicates the horizontal direction. A front side of the light source unit denotes a direction in which light is emitted from the light source unit of the vehicle lighting system, and a back side of the light source unit is a direction opposite to the front side.

Figure 1:
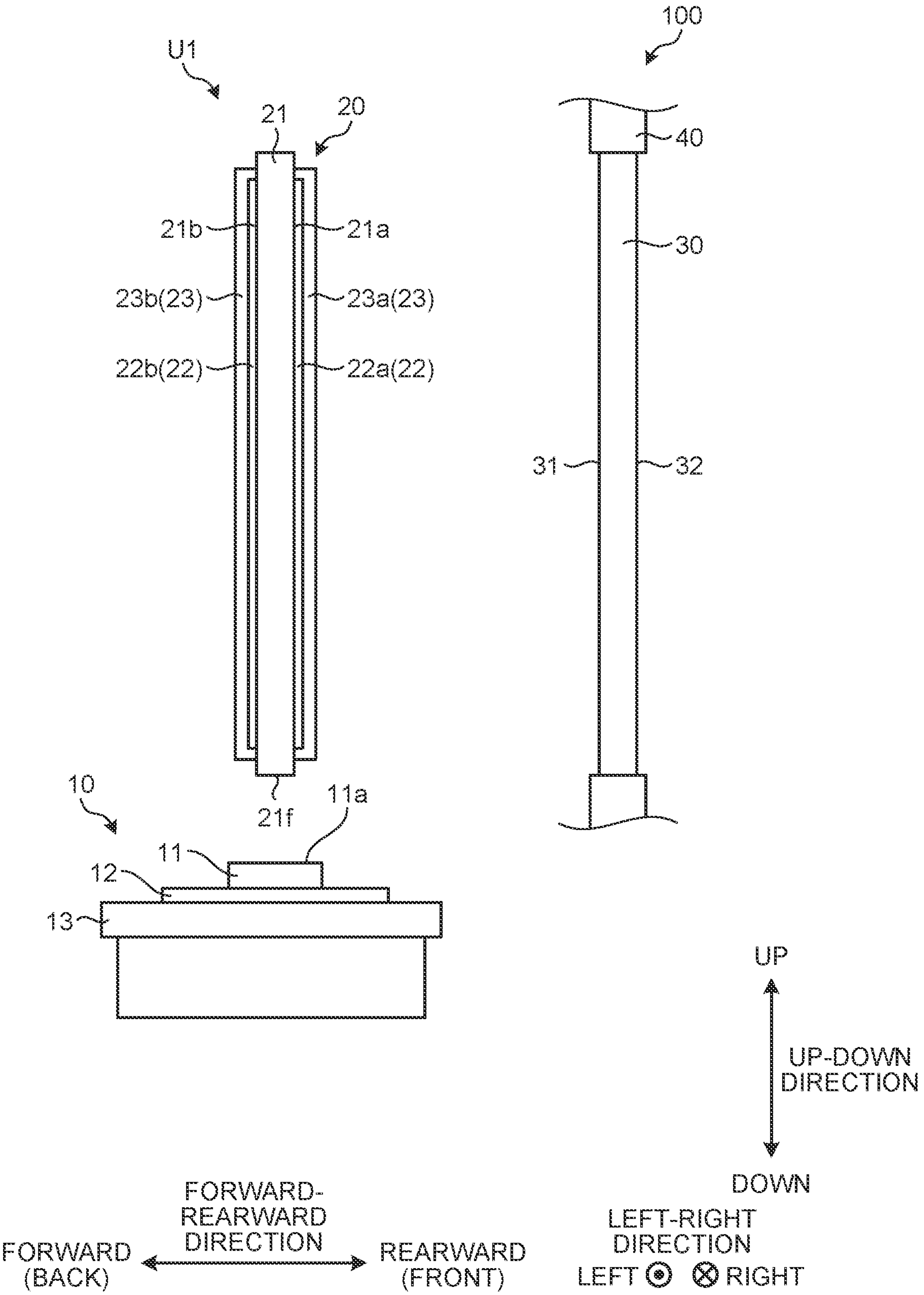
FIG. 1 is a side view of an example vehicle lighting system according to an embodiment.

FIG. 1 is a side view of an example vehicle lighting system 100 according to an embodiment. The vehicle lighting system 100 illustrated in FIG. 1 is, for example, a signal light, such as a tail light. In the embodiments, the front side of the light source unit is therefore consistent with the rearward side of the vehicle, and the back side is consistent with the forward side of the vehicle. As illustrated in FIG. 1, the vehicle lighting system 100 includes a light source unit U1 including a light source assembly 10, a light generating unit 20, and a lens member 30, and an inner panel 40. Although not illustrated in the drawing, the vehicle lighting system 100 further includes a lamp housing that accommodates the light source unit U1 and the inner panel 40, and a lamp lens.

Figure 2:
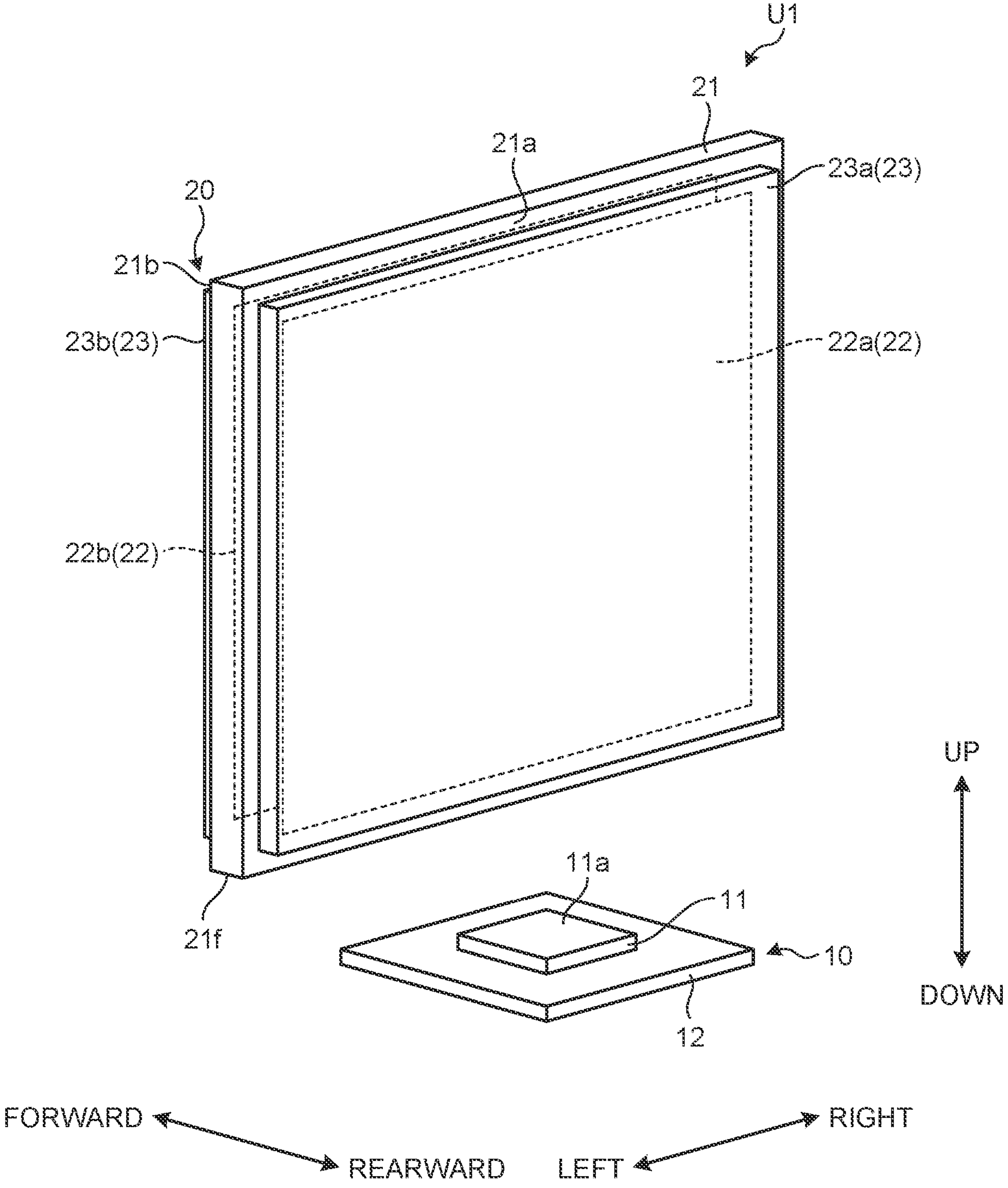
FIG. 2 is a perspective view of an example light source unit.

FIG. 2 is a perspective view of the example light source unit U1. As illustrated in FIG. 1 and FIG. 2, the light source unit U1 includes the light source assembly 10 and the light generating unit 20.

The light source part 10 includes the light source 11, the support substrate 12, and the heat sink 13. The light source 11 is, for example, a semiconductor light source, such as an LED, an OEL, and an OLED (organic EL). The light source 11 is disposed, for example, under the light generating unit 20 with a light-emitting surface 11*a* facing the light generating unit 20 (facing up). The light source 11 emits light through the light-emitting surface 11*a* in the form of a Lambertian luminous distribution. For example, the light source 11 emits blue light, as excitation light, through the light-emitting surface 11*a*. Light emitted from the light source 11 is not limited to blue light. The light source 11 may emit light having a shorter wavelength (such as purple light and ultraviolet) than the wavelength of generation light generated by the later-described light generating unit 20.

The support substrate 12 supports the light source 11. The support substrate 12 is supported by the heat sink 13. The heat sink 13 is retained by, for example, a bracket (not illustrated).

The light generating unit 20 includes a holding member 21, a luminescent layer 22, and a sealer 23. The holding member 21 is supported separately from the light source assembly 10 by, for example, a bracket (not illustrated). Separation of the holding member 21 from the light source part 10 allows more flexible arrangement of the light source part 10 and the light generating unit 20. The light source part 10 and the light generating unit 20 are therefore allowed to be flexibly arranged depending on the overall design.

The holding member 21 is capable of transmitting excitation light emitted from the light source 11. The holding member 21 can transmit excitation light and illuminate the entire surface of the later-described luminescent layer 22 by guiding the excitation light throughout the inside of the holding member 21. The holding member 21 of this embodiment is, for example, a rectangular plate and transmits generation light emitted from the later-described luminescent layer 22. The holding member 21 may be a rigid substrate formed of glass or a similar material or may be a flexible substrate formed of acrylic resin, thermoplastic resin, or a similar material. The holding member 21 has flat portions 21*a* and 21*b* at the front and back surfaces thereof. The flat portion 21*a* is disposed facing the rearward side (the front side), and the flat portion 21*b* is disposed facing the forward side (the back side). The holding member 21 has four side surfaces that connect the flat portion 21*a* and the flat portion 21*b* with each other. A side surface, of the four side surfaces, facing down includes a light-receiving surface 21*f* that faces the light-emitting surface 11*a*. Excitation light enters the holding member 21 through the light-receiving surface 21*f*, and is guided throughout the inside of the holding member 21.

The luminescent layer 22 is held by the holding member 21. The luminescent layer 22 emits generation light by being irradiated with excitation light from the light source 11. More specifically, the luminescent layers 22 are held by the respective flat portions 21*a* and 21*b* of the holding member 21. The luminescent layer 22 formed on the flat portion 21*a* and the luminescent layer 22 on the flat portion 21*b* will be referred to as, respectively, a luminescent layer 22*a* and a luminescent layer 22*b*, as needed. The luminescent layer 22 is formed as a thin film, for example, by performing thin-film preparation processing on each of the flat portions 21*a* and 21*b*. The luminescent layer 22 is transparent unless otherwise irradiated with excitation light.

For example, the luminescent layer 22 is made of an organic material or the like that is composed of a host material, such as polyvinylcarbazole, approximately 5% doped with a red phosphorescent material, such as acetylacetone. In this composition, the luminescent layer 22 emits red light as the generation light. The host material and the dopant are not limited to the above materials. The luminescent layer 22 may use an inorganic material, such as yttrium aluminum garnet (YAG).

Figure 3:
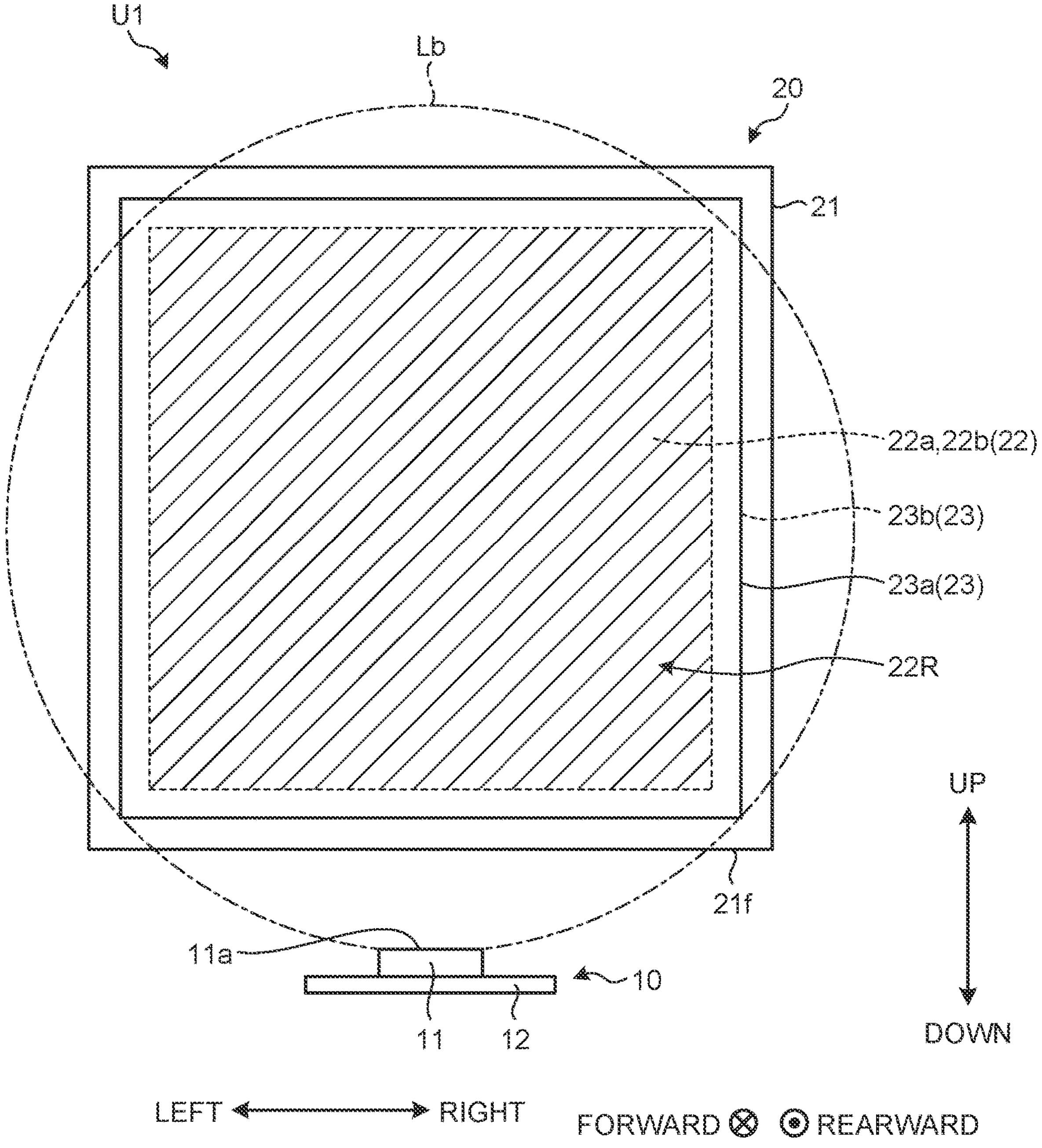
FIG. 3 is a drawing of an example light generating unit viewed from the front.

The luminescent layer 22*a* and the luminescent layer 22*b* are identical to each other in size and shape, and are consistently aligned, for example, when viewed from the front. FIG. 3 is a drawing of the example light generating unit 20 when viewed from the front. In FIG. 3, although the luminescent layers 22*a* and 22*b* in this embodiment are rectangular, the shape is not limited thereto. For example, the luminescent layers 22*a* and 22*b* may have a shape corresponding to the shape of the tail light when viewed from the front.

The luminescent layers 22*a* and 22*b*, formed in the above size and shape and aligned as described above, form a luminescent region 22R when viewed from the front. The luminescent region 22R is defined by, for example, the outer peripheries of the luminescent layers 22*a* and 22*b*. Red light generated in the luminescent layer 22*a* is partially emitted toward the front side. Red light generated in the luminescent layer 22*b* partially passes through the holding member 21 and the luminescent layer 22*a* and is emitted toward the front. The red light from the luminescent layers 22*a* and 22*b* goes out from the luminescent region 22R toward the front, to provide surface emitting.

The sealer 23 transmits excitation light and red light. The sealer 23 seals the luminescent layer 22. The sealer 23 may be, as with the holding member 21, a rigid substrate formed of glass, epoxy resin, or a similar material, or may be a flexible substrate formed of acrylic resin, thermoplastic resin, or a similar material.

The lens member 30 is disposed in front of the light generating unit 20. The lens member 30 has the light-receiving surface 31 and the light-output surface 32. The light-receiving surface 31 receives red light, which is generation light emitted from the light generating unit 20. The light-output surface 32 outputs light incident on the light-receiving surface 31, toward the front. The lens member 30 transmits red light and absorbs light different from the red light. The lens member 30 therefore absorbs elements of excitation light contained in outside light. The inner panel 40 retains the lens member 30.

Figure 4:
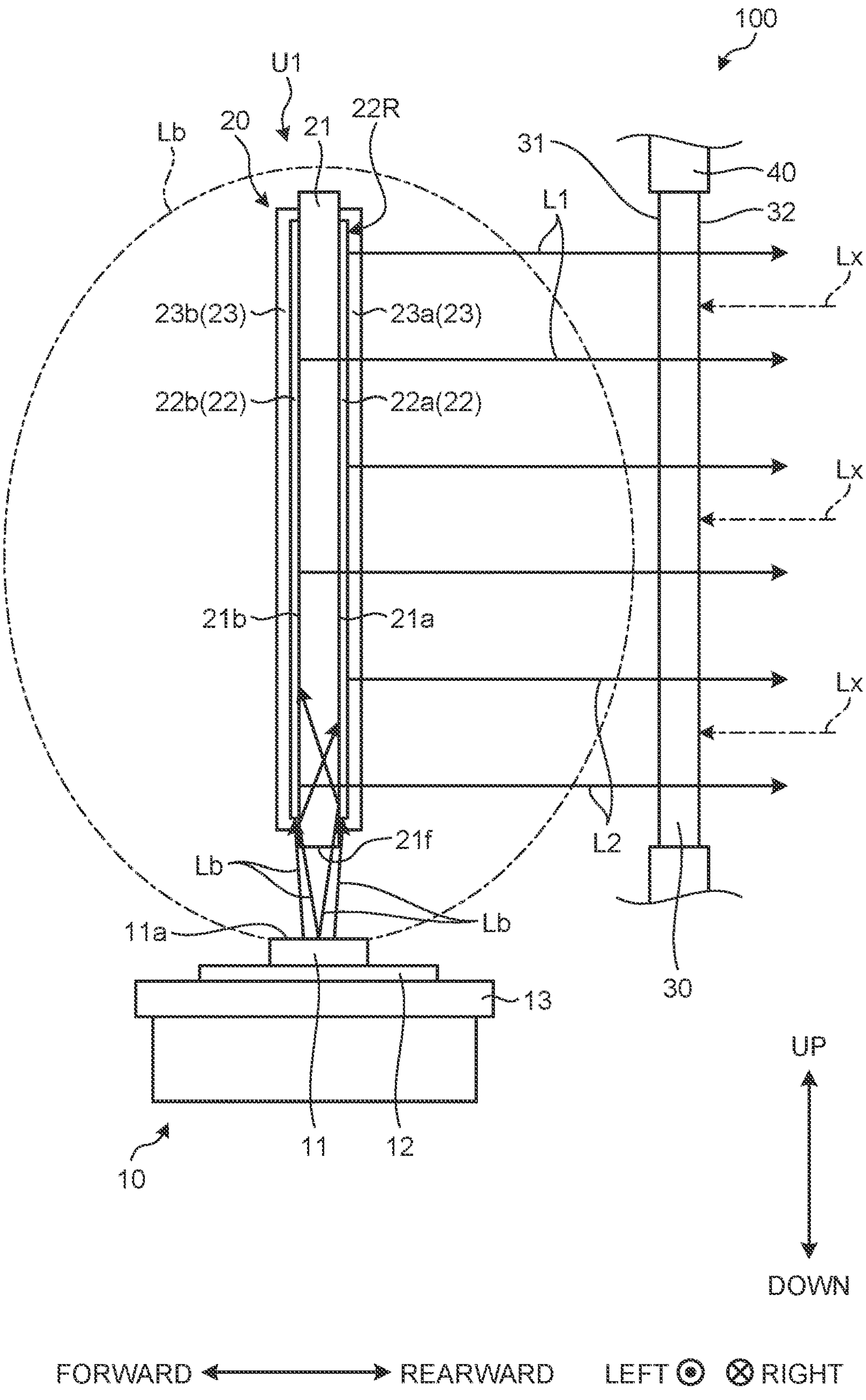
FIG. 4 is a drawing that illustrates example operation of the vehicle lighting system.

Operation of the vehicle lighting system 100 configured as above will now be described. FIG. 4 is a drawing that illustrates example operation of the vehicle lighting system 100. As illustrated in FIG. 4, when the light source 11 is turned on, excitation light Lb is emitted from the light-emitting surface 11*a* in the pattern of Lambertian radiation, and a part of the excitation light Lb directly illuminates the luminescent layers 22*a* and 22*b*. Another part of the excitation light Lb enters the holding member 21 through the light-receiving surface 21*f*, and illuminates the luminescent layers 22*a* and 22*b* by being guided through the holding member 21.

Upon irradiation with the excitation light Lb, the luminescent layer 22*a* is excited to generate red light L1. A part of the red light L1 generated at the luminescent layer 22*a* passes through a sealer 23*a* and proceeds toward the rearward side (the front side). Upon irradiation with the excitation light Lb, the luminescent layer 22*b* is excited to generate red light L2. A part of the red light L2 generated at the luminescent layer 22*b* passes through the holding member 21, the luminescent layer 22*a*, and the sealer 23*a*, and proceeds toward the rearward side (the front side). The red lights L1 and L2 generated at the luminescent layers 22*a* and 22*b* are output toward the front from the luminescent region 22R and provide surface emitting. The red lights L1 and L2 enter the light-receiving surface 31 of the lens member 30, pass through the light-output surface 32 of the lens member 30 toward the front side, and radiate, for example, in the illumination pattern of the tail light.

When the light source 11 is turned off, no excitation light Lb is emitted from the light source 11, and the luminescent layers 22*a* and 22*b* thus generate no red light L1 or L2. In this embodiment, the luminescent layers 22*a* and 22*b* are made of an organic material, and are transparent unless otherwise irradiated with the excitation light Lb. This structure therefore allows the viewer to see as if there were no luminescent layers 22*a* or 22*b* inside the lens member 30. Since the lens member 30 transmits red light and absorbs light different from red light, an element Lx of excitation light contained, for example, in outside light is absorbed by the lens member 30. This structure can prevent the luminescent layer 22 from emitting light while the light source 11 is off.

As described above, the light source unit U1 according to this embodiment includes the light source 11 to emit excitation light, the light generating unit 20 including the luminescent layer 22 to generate red light, or generation light, upon irradiation with the excitation light and the holding member 21 holding the luminescent layer 22, and further includes the lens member 30 to output the generation light emitted from the luminescent layer 22 toward the front, with the light source unit U1 mounted on the vehicle.

With this configuration, the luminescent layer 22 generates red light, as generation light, upon irradiation with excitation light from the light source 11. This configuration reduces electrical deterioration which may occur in an organic light-emitting diode. Such a vehicle lighting system 100 that can provide surface emitting while securing reliability of the light source 11 is therefore obtained at a lower cost. Furthermore, the light source 11 is disposed separately from the holding member 21, which allows flexible arrangement of the light source assembly 10 and the light generating unit 20. The light source assembly 10 and the light generating unit 20 can therefore be flexibly arranged depending on the overall design.

In the light source unit U1 according to this embodiment, the luminescent layer 22 is formed of an organic material. This is effective in providing surface emitting, and allows the luminescent layer to be kept transparent unless otherwise irradiated with excitation light.

In the light source unit U1 according to this embodiment, the light generating unit 20 may include the sealer 23 that transmits excitation light and red light and seals the luminescent layer 22. Use of the sealer 23 can reduce deterioration of the luminescent layer 22 and increase the service life thereof.

In the light source unit U1 according to this embodiment, the holding member 21 is in the form of a plate having the flat portions 21*a* and 21*b* at the front and back surfaces thereof. The luminescent layer 22 is formed on at least one of the flat portions 21*a* and 21*b*, at the front and back surfaces of the holding member 21. The light generating unit 20 has the flat portion 21*a* having the luminescent layer 22 and disposed on the front side. This structure allows red light generated in the luminescent layer 22 to be efficiently emitted toward the front.

In the light source unit U1 according to this embodiment, the holding member 21 is capable of transmitting red light. The luminescent layer 22 is formed on each of the flat portions 21*a* and 21*b* at the front and back surfaces of the holding member 21. Such effective formation of the luminescent layer 22 is advantageous in obtaining a larger amount of light.

In the light source unit U1 according to this embodiment, the holding member 21 has side surfaces that connect the flat portions 21*a* and 21*b* at the front and back surfaces with each other. The light source 11 has the light-emitting surface 11*a* to emit excitation light facing one of the side surfaces. This structure allows the excitation light to enter the holding member 21 through the side surface and to illuminate the luminescent layer 22 by being guided throughout the inside of the holding member 21. This structure allows the excitation light to further efficiently illuminate the luminescent layer 22.

In the light source unit U1 according to this embodiment, the luminescent layer 22 emits red light, which is generation light. Surface emitting using red light is therefore easily obtained for use of tail lights or similar devices.

In the light source unit U1 according to this embodiment, the lens member 30 transmits red light and absorbs light different from red light. The lens member 30 thus can absorb elements of excitation light contained in outside light. This structure can prevent the luminescent layer 22 from emitting light while the light source 11 is off.

The vehicle lighting system 100 according to this embodiment includes the above light source unit U1. The configuration of the light source unit U1 enables surface emitting while securing reliability of the light source 11, and also enables a reduction in the cost of the light source unit U1. Stable surface emitting at a lower cost is therefore achieved with the vehicle lighting system 100.

Figure 5:
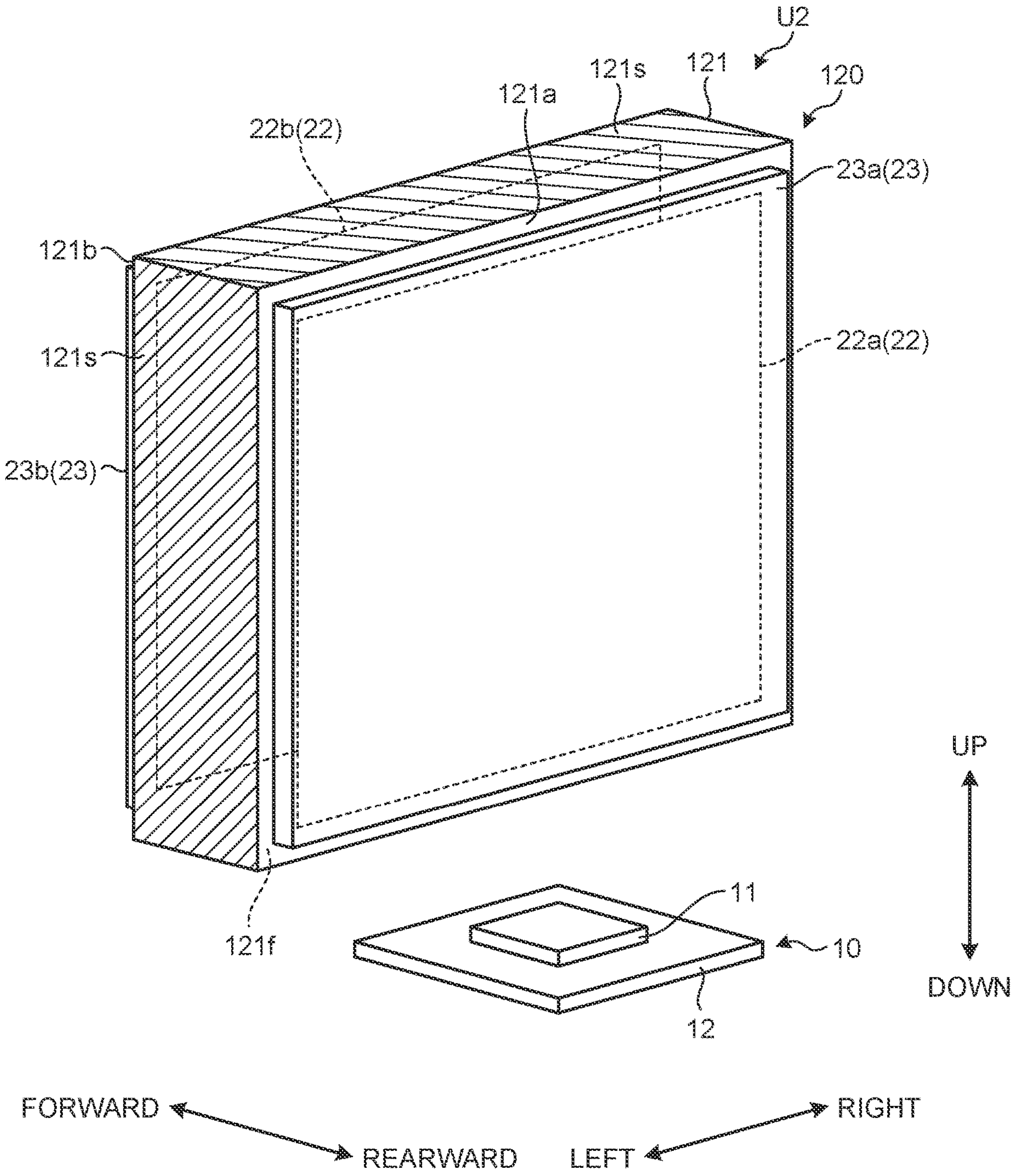
FIG. 5 is a side view of an example light source unit according to a modification.

FIG. 5 is a side view of an example light source unit U2 according to a modification. As illustrated in FIG. 5, the light source unit U2 includes the light source assembly 10, a light generating unit 120, and a lens member (not illustrated). The light source assembly 10 and the lens member have the same configurations as those described in the above embodiment. In the example of FIG. 5, a holding member 121 of the light generating unit 120 has a size (thickness) in the forward-rearward direction larger than that of the holding member 21 of the embodiment. This structure allows excitation light from the light source 11 to easily enter the holding member 121. A larger amount of excitation light is therefore guided by the holding member 121 and illuminates the luminescent layers 22 (22*a* and 22*b*).

One of the side surfaces of the holding member 121 has a light-receiving surface 121*f*, and another side surface different from the side surface has a light diffusing portion 121*s*. The light diffusing portion 121*s* diffuses excitation light entering the holding member 121, within the holding member 121. Examples of the light diffusing portion 121*s* include a prism that causes internal reflection of the excitation light in the holding member 121. The internal reflection allows the excitation light to uniformly illuminate the entire surface of the luminescent layer 22 (22*a* and 22*b*), and red light thus can be efficiently generated in the luminescent layer 22.

Figure 6:
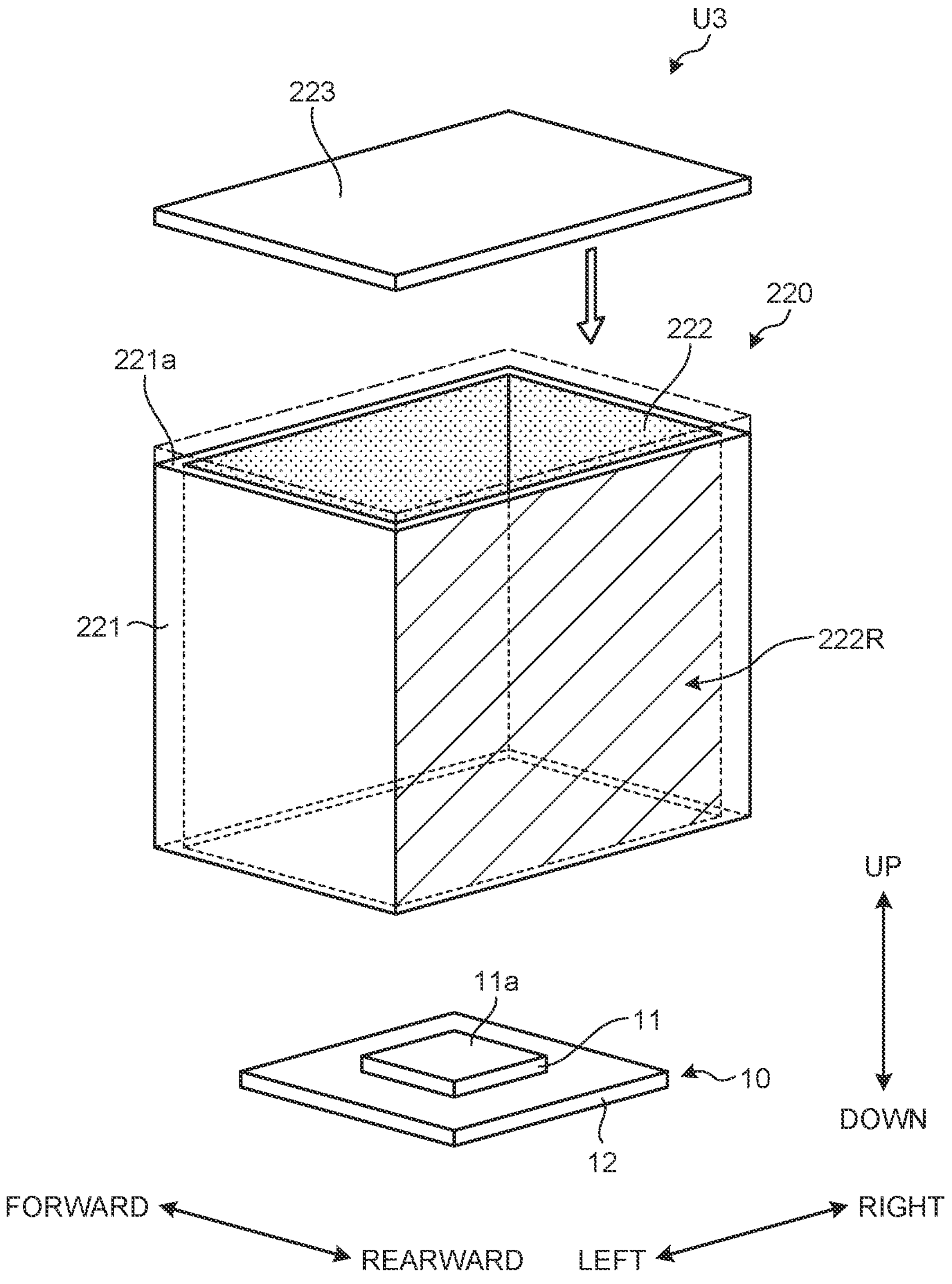
FIG. 6 is an exploded perspective view of an example light source unit according to a modification.

FIG. 6 is an exploded perspective view of an example light source unit U3 according to a modification. As illustrated in FIG. 6, the light source unit U3 includes the light source assembly 10, a light generating unit 220, and a lens member (not illustrated). The light source assembly 10 and the lens member have the same configurations as those of the above light source unit U1. In the example of FIG. 6, a holding member 221 of the light generating unit 220 is in the shape of a rectangular box made of glass or a similar material. The holding member 221 accommodates therein a luminescent layer 222. The holding member 221 is capable of transmitting excitation light emitted from the light source 11 and red light generated in the luminescent layer 222.

The luminescent layer 222 is prepared, for example, by dissolving a host material such as polyvinylcarbazole and a red phosphorescent material such as acetylacetone in a solvent such as dichloroethane. The luminescent layer 222 may be formed of other materials, without being limited to the above materials. In this embodiment, the luminescent layer 222 is a solid having dimensions in the up-down direction, the left-right direction, and the forward-rearward direction. For example, when viewed from the up, the center of the luminescent layer 222 in the forward-rearward direction and the left-right direction is consistent with the center of the light-emitting surface 11*a* of the light source 11 in the forward-rearward direction and the left-right direction. This arrangement allows excitation light emitted from the light source 11 in the pattern of Lambertian radiation to efficiently illuminate the luminescent layer 222.

For example, a plate-like sealer 223 is mounted on a top surface 221*a* of the holding member 221. The sealer 223 is attached to the top surface 221*a* of the holding member 221 with, for example, epoxy resin. The luminescent layer 222 is sealed inside the holding member 221 by the sealer 223.

In this configuration, when the light source 11 is turned on, excitation light in the pattern of Lambertian radiation passes through the holding member 221 and illuminates the luminescent layer 222. Upon irradiation with the excitation light, the luminescent layer 222 is excited to generate red light. When the light generating unit 220 is viewed from the rearward (from the front), the red light produces surface emitting on the luminescent region 222R, defined by the outer peripheral surfaces of the luminescent layer 222. Since the light source unit U3 illustrated in FIG. 6 can three-dimensionally generate red light in the luminescent layer 222, a sufficient amount of red light is obtained.

Figure 7:
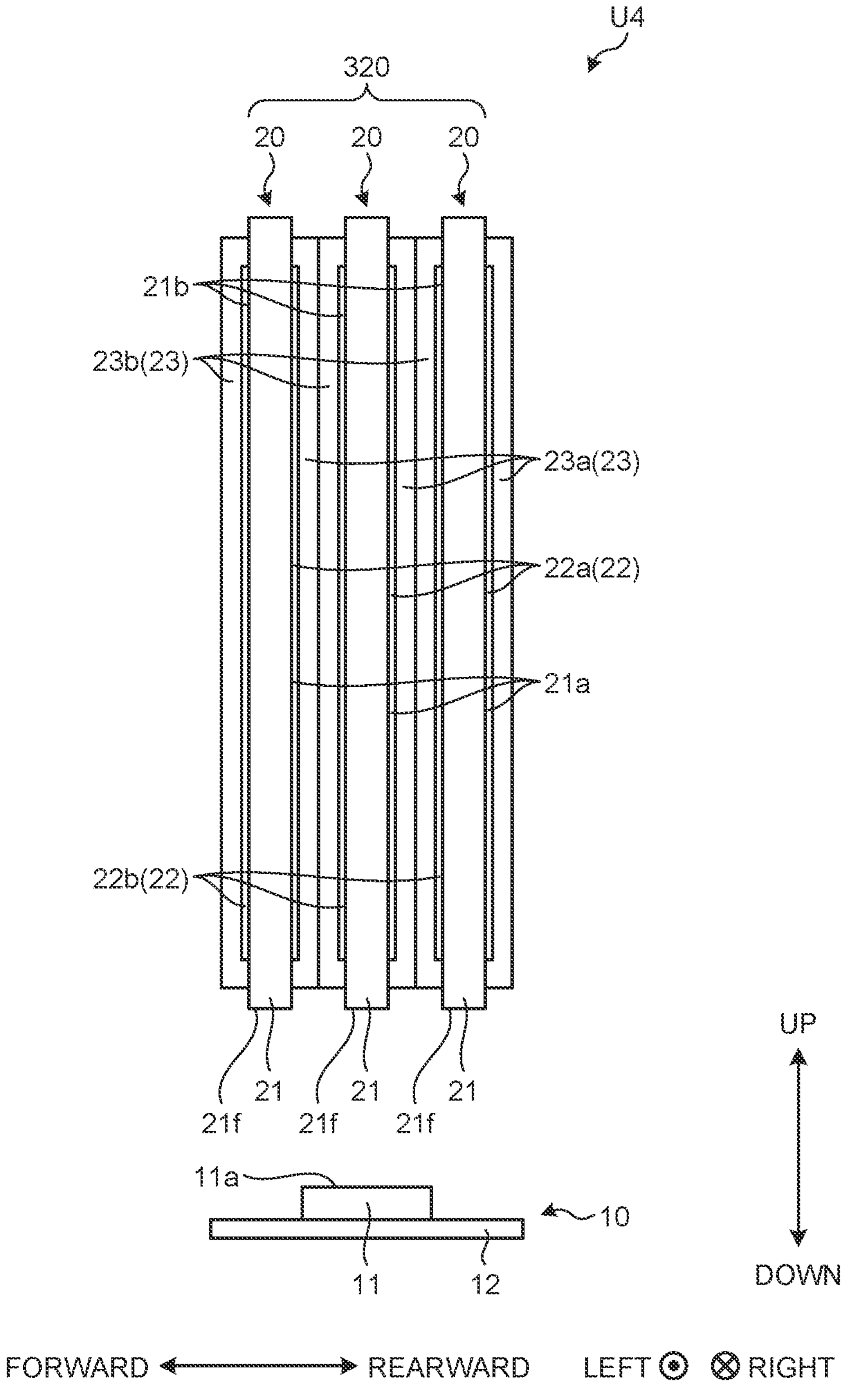
FIG. 7 is a side view of an example light source unit according to a modification.

FIG. 7 is a side view of an example light source unit U4 according to a modification. As illustrated in FIG. 7, the light source unit U4 includes the light source assembly 10, a light generating unit 320, and a lens member (not illustrated). The light source assembly 10 and the lens member have the same configurations as those of the above light source unit U1. In the example of FIG. 7, the light generating unit 320 includes a plurality of light generating units 20, described in the embodiment, stacked in the forward-rearward direction (the front-back direction). Although three light generating units 20 are used in the example of FIG. 7, the number of units is not limited thereto. Two, four, or more light generating units 20 may be used. In this example, a plurality of light generating units 20 are arranged in the forward-rearward direction (the front-back direction). This configuration allows excitation light to efficiently illuminate the luminescent layers 22 (22*a* and 22*b*) and thus allows the luminescent layers 22 to efficiently generate red light.

Figure 8:
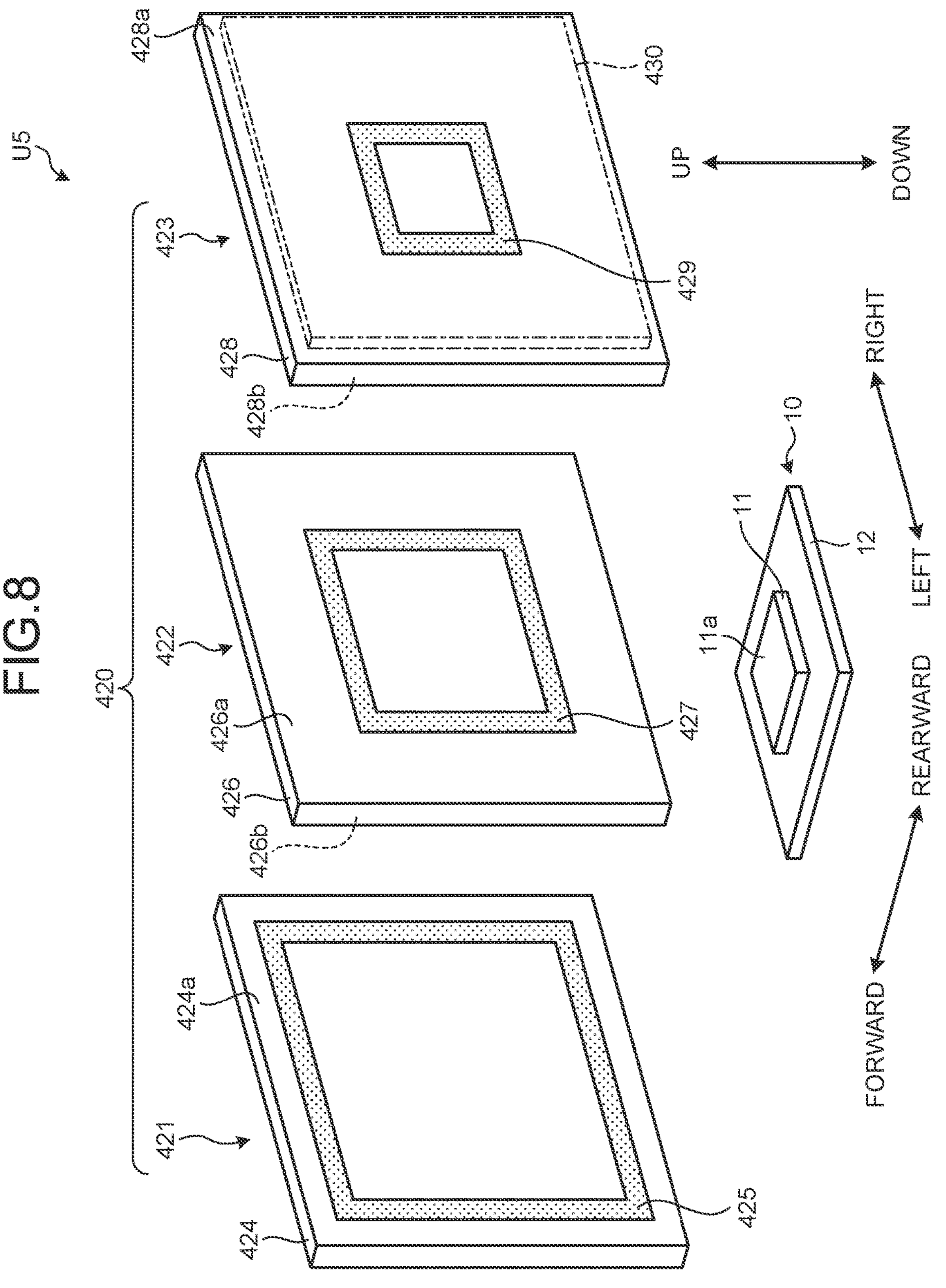
FIG. 8 is an exploded perspective view of an example light source unit according to a modification.
Figure 9:
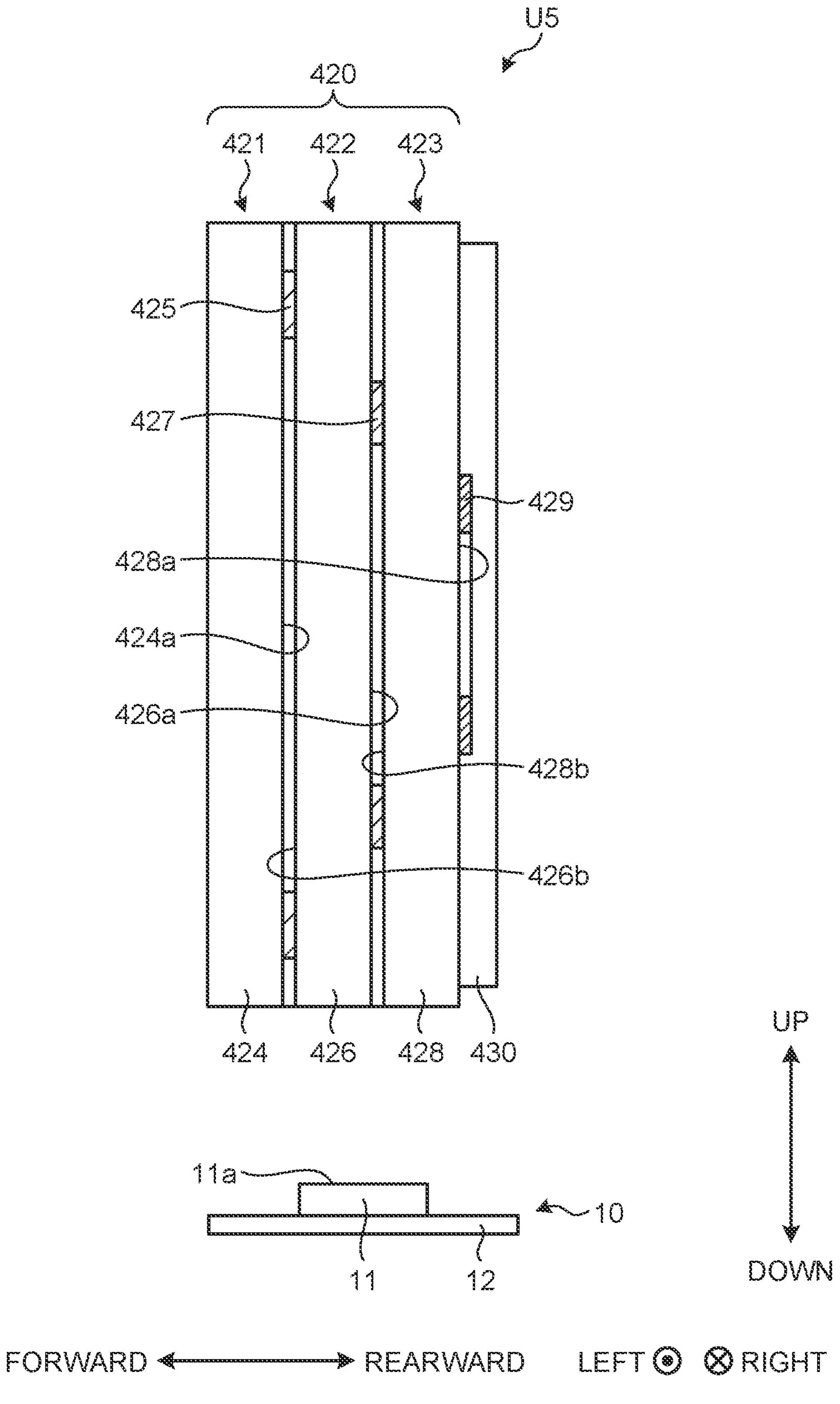
FIG. 9 is a side view of the example light source unit.

FIG. 8 is an exploded perspective view of an example light source unit U5 according to a modification. FIG. 8 illustrates a light generating unit 420 separated in parts. FIG. 9 is a side view of the example light source unit U5. The light source unit U5 illustrated in FIG. 8 and FIG. 9 includes the light source assembly 10, the light generating unit 420, and a lens member (not illustrated). The light source assembly 10 and the lens member have the same configurations as those of the above light source unit U1. In the example of FIG. 8 and FIG. 9, the light generating unit 420 includes a first light generating unit 421, a second light generating unit 422, and a third light generating unit 423 that are stacked in the forward-rearward direction (the front-back direction).

The first light generating unit 421 includes a holding member 424 and a luminescent layer 425. The second light generating unit 422 includes a holding member 426 and a luminescent layer 427. The third light generating unit 423 includes a holding member 428 and a luminescent layer 429. The holding members 424, 426, and 428 have the same configurations as the configuration of the holding member 21 described in the above embodiment.

The luminescent layer 425 is a thin film formed on a flat portion 424*a* of the holding member 424. Likewise, the luminescent layer 427 is a thin film formed on a flat portion 426*a* of the holding member 426. The luminescent layer 429 is a thin film formed on a flat portion 428*a* of the holding member 428.

The holding members 424, 426, and 428 are attached to one another with, for example, epoxy resin. More specifically, the flat portion 424*a* of the holding member 424 and a flat portion 426*b* of the holding member 426 are attached to each other, and the flat portion 426*a* of the holding member 426 and a flat portion 428*b* of the holding member 428 are attached to each other. The luminescent layer 425, held between the holding member 424 and the holding member 426, and the luminescent layer 427, held between the holding member 426 and the holding member 428, are sealed with epoxy resin. The luminescent layer 429 formed on the flat portion 428*a* of the holding member 428 is sealed by a sealer 430. The sealer 430 may have the same structure as that of the sealer 23 of the above embodiment.

Figure 10:
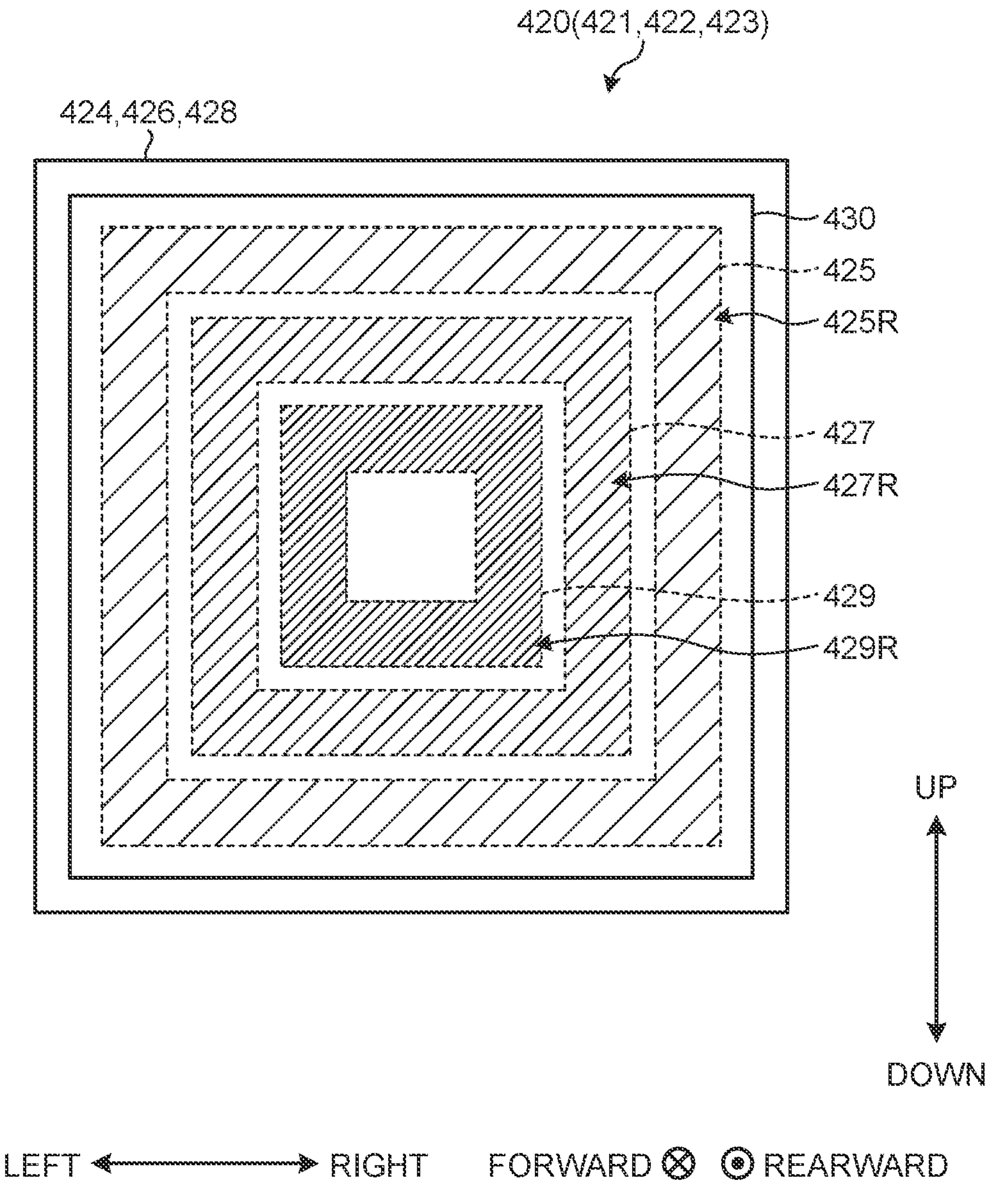
FIG. 10 is a drawing of an example light source unit viewed from the front.

FIG. 10 is a drawing of an example light source unit U5 when viewed from the front. As illustrated in FIG. 10, the luminescent layer 425 is in the form of a rectangular frame when viewed from the front. The luminescent layer 427 is in the form of a rectangular frame the dimensions of which are smaller than those of the luminescent layer 425 when viewed from the front. The luminescent layer 427 is arranged inside the luminescent layer 425. The luminescent layer 429 is in the form of a rectangular frame the dimensions of which are smaller than those of the luminescent layer 427 when viewed from the front. The luminescent layer 429 is arranged inside the luminescent layer 427. In the front view, the frame-shaped luminescent layers 425, 427, and 429 have dimensions different from one another, and are located in respective different regions. The luminescent layers 425, 427, and 429 are not necessarily in the shape of a rectangular frame when viewed from the front, and may be in another shape.

Red light emitted outside from these luminescent layers 425, 427, and 429 provides the viewer with a sense of depth in the illumination design. Among three luminescent regions, the luminescent layer 425 forming an outer luminescent region 425R is disposed in the most backward, the luminescent layer 427 forming a middle luminescent region 427R is disposed in the middle in the forward-rearward direction (the front-back direction), and the luminescent layer 429 forming an inner luminescent region 429R is disposed in the most frontward. The viewer sees the red light from the outer luminescent region 425R shining at the back, and the red light from the middle luminescent region 427R shining in the middle, and the red light from the inner luminescent region 429R shining at the front.

Figure 11:
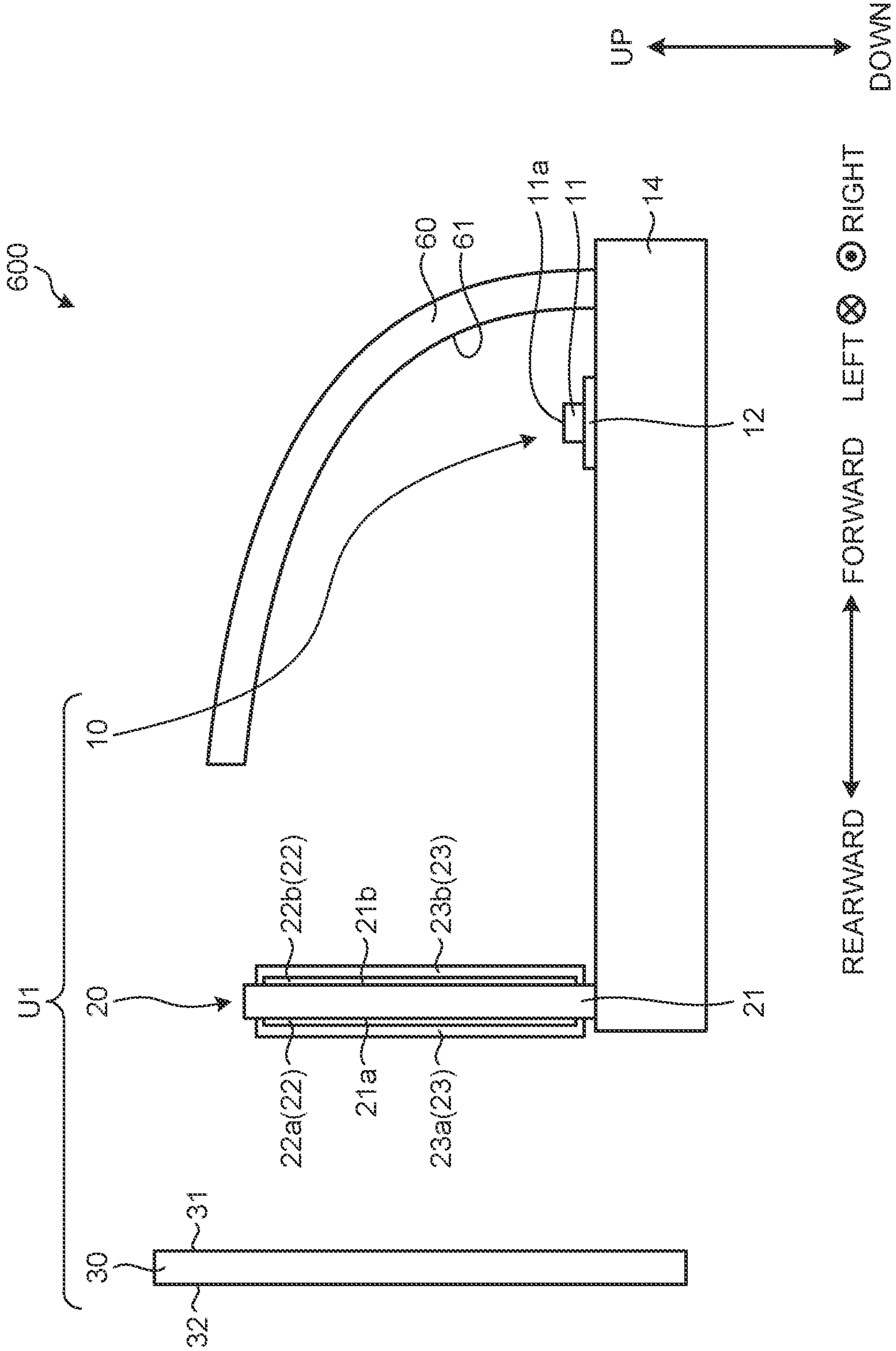
FIG. 11 is a drawing of an example vehicle lighting system according to a modification.

FIG. 11 is a drawing of an example vehicle lighting system 600 according to a modification. As illustrated in FIG. 11, the vehicle lighting system 600 includes the light source unit U1 including the light source assembly 10, the light generating unit 20, the lens member 30, and a reflector 60. The light source assembly 10, the light generating unit 20, and the lens member 30 have the same configurations as those described in the above embodiment. The light source unit U1 may be replaced by any of the above light source units U2 to U5. In the example of FIG. 11, the light source assembly 10 and the light generating unit 20 are disposed on a heat sink 14, and the reflector 60 is disposed between the light source assembly 10 and the light generating unit 20. The reflector 60 has a reflective surface 61 that reflects excitation light from the light source 11 toward the light generating unit 20. Use of the reflector 60 allows the luminescent layer 22 to be efficiently illuminated.

Figure 12:
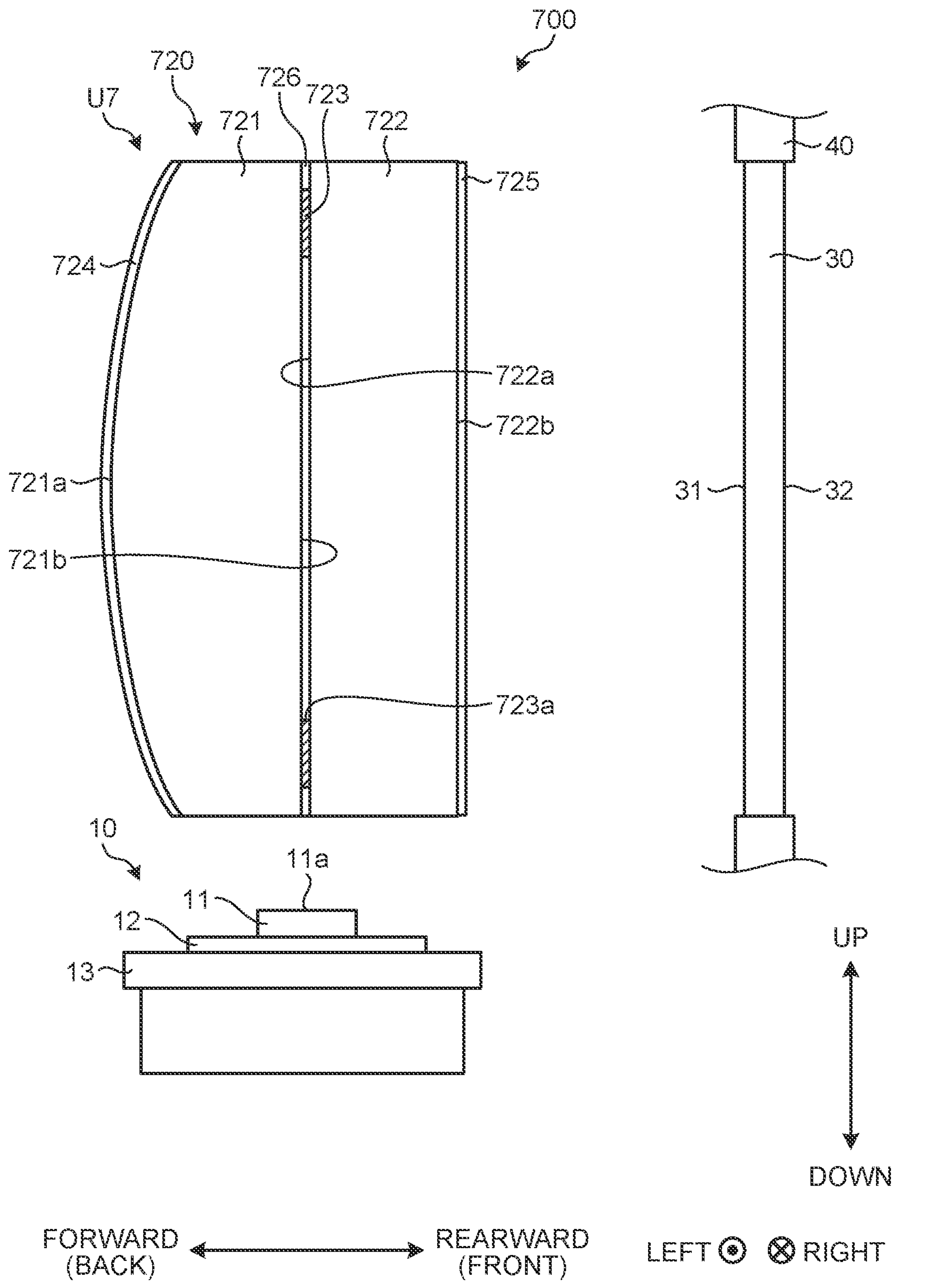
FIG. 12 is a side view of an example vehicle lighting system according to another embodiment.

FIG. 12 is a side view of an example vehicle lighting system 700 according to another embodiment. The vehicle lighting system 700 illustrated in FIG. 12 is, for example, a signal lamp, such as a tail light. The rearward side of the vehicle indicated in this embodiment is therefore a front side of the light source, and the forward side of the vehicle is a back side of the light source. As illustrated in FIG. 12, the vehicle lighting system 700 includes a light source unit U7 including the light source assembly 10 and a light generating unit 720 and the lens member 30, and the inner panel 40. Although not illustrated in the drawing, the vehicle lighting system 700 further includes a lamp housing that accommodates the light source unit U7 and the inner panel 40 and a lamp lens.

The light source assembly 10 includes the light source 11, the support substrate 12, and the heat sink 13. The light source 11 is, for example, a semiconductor light source, such as an LED, an OEL, and an OLED (organic EL). The light source 11 is disposed, for example, under the light generating unit 720 with the light-emitting surface 11*a* facing the light generating unit 720 (facing up). The light source 11 emits light through the light-emitting surface 11*a* in the form of a Lambertian luminous distribution. For example, the light source 11 emits blue light, as excitation light, through the light-emitting surface 11*a*. Light emitted from the light source 11 is not limited to blue light. The light source 11 may emit light having a shorter wavelength (such as purple light and ultraviolet) than the wavelength of generation light generated by the later-described light generating unit 720.

The support substrate 12 supports the light source 11. The support substrate 12 is supported by the heat sink 13. The heat sink 13 is retained by, for example, a bracket (not illustrated).

The light generating unit 720 includes holding members 721 and 722, a luminescent layer 723, a reflective layer 724, and a semi-transmissive reflective layer 725. The holding members 721 and 722 are supported separately from the light source assembly 10 by brackets or similar members (not illustrated). Separation of the holding members 721 and 722 from the light source assembly 10 allows more flexible arrangement of the light source assembly 10 and the light generating unit 720. The light source assembly 10 and the light generating unit 720 are therefore allowed to be flexibly arranged depending on the overall design.

The holding members 721 and 722 are capable of transmitting excitation light emitted from the light source 11. The holding members 721 and 722 transmit the excitation light and illuminate the entire surface of the later-described luminescent layer 723 by guiding the excitation light throughout the inside of the holding members 721 and 722. The holding members 721 and 722 of this embodiment are, for example, in the form of a plate, and capable of transmitting generation light generated in the later-described luminescent layer 723. The holding members 721 and 722 may be rigid substrates formed of glass or a similar material or may be flexible substrates formed of acrylic resin, thermoplastic resin, or a similar material.

The holding member 721 has a curved portion 721*a* and a flat portion 721*b*. The curved portion 721*a* is disposed facing the forward side (the back side). The curved portion 721*a* is curvedly projecting toward the forward side (the back side). In this embodiment, for example, the curved portion 721*a* may have the degree of projection increasing from the edges in the up-down direction and the left-right direction toward the center. The shape of the curved portion 721*a* is not limited thereto. For example, the curved portion 721*a* may have the degree of projection increasing from the edges in either the up-down direction or the left-right direction, toward the center. The flat portion 721*b* is disposed facing the rearward side (the front side).

The holding member 721 has four side surfaces that connect the curved portion 721*a* and the flat portion 721*b* with each other. A side surface, of the four side surfaces, facing down has a light-receiving surface 721*f* that faces the light-emitting surface 11*a*. The holding member 721 receives excitation light from the light-receiving surface 721*f* and guides the light throughout the inside of the holding member 721.

The holding member 722 is disposed on the front side of the holding member 721. The holding member 722 has flat portions 722*a* and 722*b*. The flat portion 722*a* is disposed facing the forward side (the back side). The flat portion 722*b* is disposed facing the rearward side (the front side). The holding member 722 has four side surfaces that connect the flat portion 722*a* and the flat portion 722*b* with each other. A side surface, of the four side surfaces, facing down has a light-receiving surface 722*f* that faces the light-emitting surface 11*a*. The holding member 722 receives excitation light from the light-receiving surface 722*f* and guides the light throughout the inside of the holding member 722.

Upon irradiation with the excitation light from the light source 11, the luminescent layer 723 is excited to generate generation light. The luminescent layer 723 is transparent unless otherwise irradiated with the excitation light. The luminescent layer 723 is held between the flat portion 721*b* of the holding member 721 and the flat portion 722*a* of the holding member 722. The luminescent layer 723 is formed as a thin film by performing thin-film preparation processing on the flat portion 721*b* or the flat portion 722*a*. Red light generated in the luminescent layer 723 is partially emitted toward the forward side and partially emitted toward the rearward side.

Figure 13:
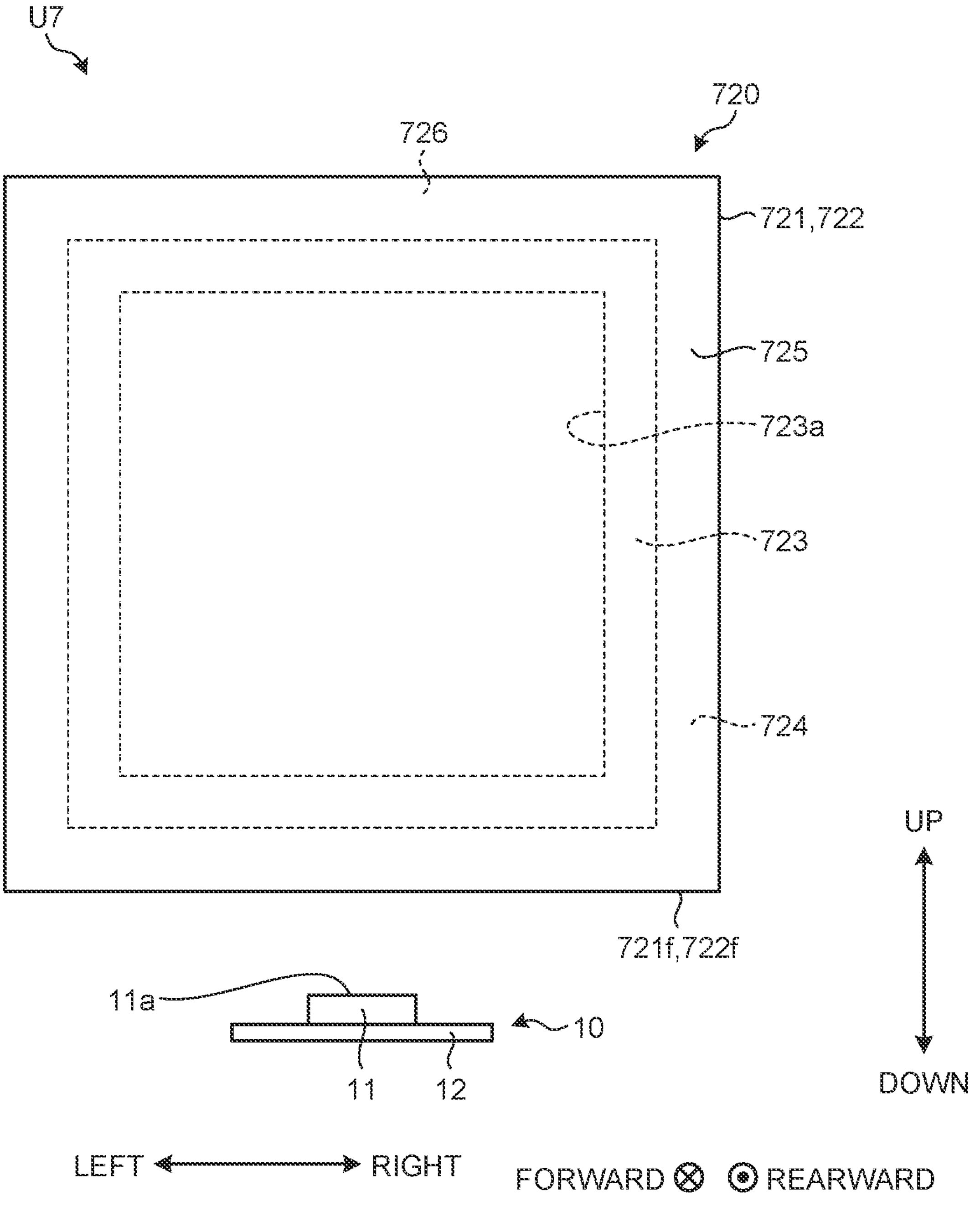
FIG. 13 is a front view of the example light source unit.

FIG. 13 is a front view of the example light source unit U7. When viewed from the rearward, as illustrated in FIG. 13, the luminescent layer 723 of this embodiment is in the form of a rectangular frame arranged along the outer peripheries of the holding members 721 and 722. The luminescent layer 723 has an aperture 723*a* in the middle thereof. The shape of the luminescent layer 723 is not limited thereto.

The luminescent layer 723 is made of an organic material or the like, composed of a host material, such as polyvinylcarbazole, approximately 5% doped with a red phosphorescent material, such as acetylacetone, for example. In this composition, the luminescent layer 723 emits red light as generation light. The host material and the dopant are not limited to the above materials. The luminescent layer 723 may use an inorganic material, such as yttrium aluminum garnet (YAG).

As illustrated in FIG. 12, the reflective layer 724 is disposed on the forward side of the luminescent layer 723. The reflective layer 724 reflects generation light generated in the luminescent layer 723 toward the rearward side (the front side). The reflective layer 724 is a thin film formed of metal or a similar material and stretched along the curved portion 721*a* of the holding member 721. The reflective layer 724 is therefore curvedly projecting toward the forward side (the back side) along the curved portion 721*a*. More specifically, the reflective layer 724 has the degree of projection increasing from the ends in the up-down direction and the left-right direction, toward the center. If the curved portion 721*a* has the degree of projection increasing from the ends in either the up-down direction or the left-right direction toward the center, the reflective layer 724 is similarly has the degree of projection increasing from the ends in either the up-down direction or the left-right direction toward the center.

The semi-transmissive reflective layer 725 is disposed on the front side of the luminescent layer 723. More specifically, the semi-transmissive reflective layer 725 is located opposite to the reflective layer 724 with the luminescent layer 723 disposed therebetween. The semi-transmissive reflective layer 725 partially transmits generation light and partially reflects the generation light toward the forward side (the back side). The semi-transmissive reflective layer 725 is a thin film formed of metal or a similar material and stretched on the flat portion 722*b* of the holding member 722. The semi-transmissive reflective layer 725 is therefore flat.

A sealer 726 is disposed between the peripheral edge of the flat portion 721*b* of the holding member 721 and the peripheral edge of the flat portion 722*a* of the holding member 722, and seals the luminescent layer 723. The sealer 726 may be, as with the holding members 721 and 722, a rigid substrate formed of glass, epoxy resin, or a similar material, or may be a flexible substrate formed of acrylic resin, thermoplastic resin, or a similar material. The sealer 726 may be provided to fill the aperture 723*a* of the luminescent layer 723. The holding member 721 and the holding member 722 may be partially accommodated in the aperture 723*a* of the luminescent layer 723.

The lens member 30 is disposed in front of the light generating unit 720. The lens member 30 emits red light, which is generation light passing through the semi-transmissive reflective layer 725 of the light generating unit 720, toward the rearward side (the front side). The lens member 30 has the light-receiving surface 31 and the light-output surface 32. The light-receiving surface 31 receives red light passing through the semi-transmissive reflective layer 725. The light-output surface 32 outputs light incident on the light-receiving surface 31, toward the front side. The lens member 30 transmits red light and absorbs light different from the red light. The lens member 30 therefore absorbs elements of excitation light contained in outside light. The inner panel 40 retains the lens member 30.

Figure 14:
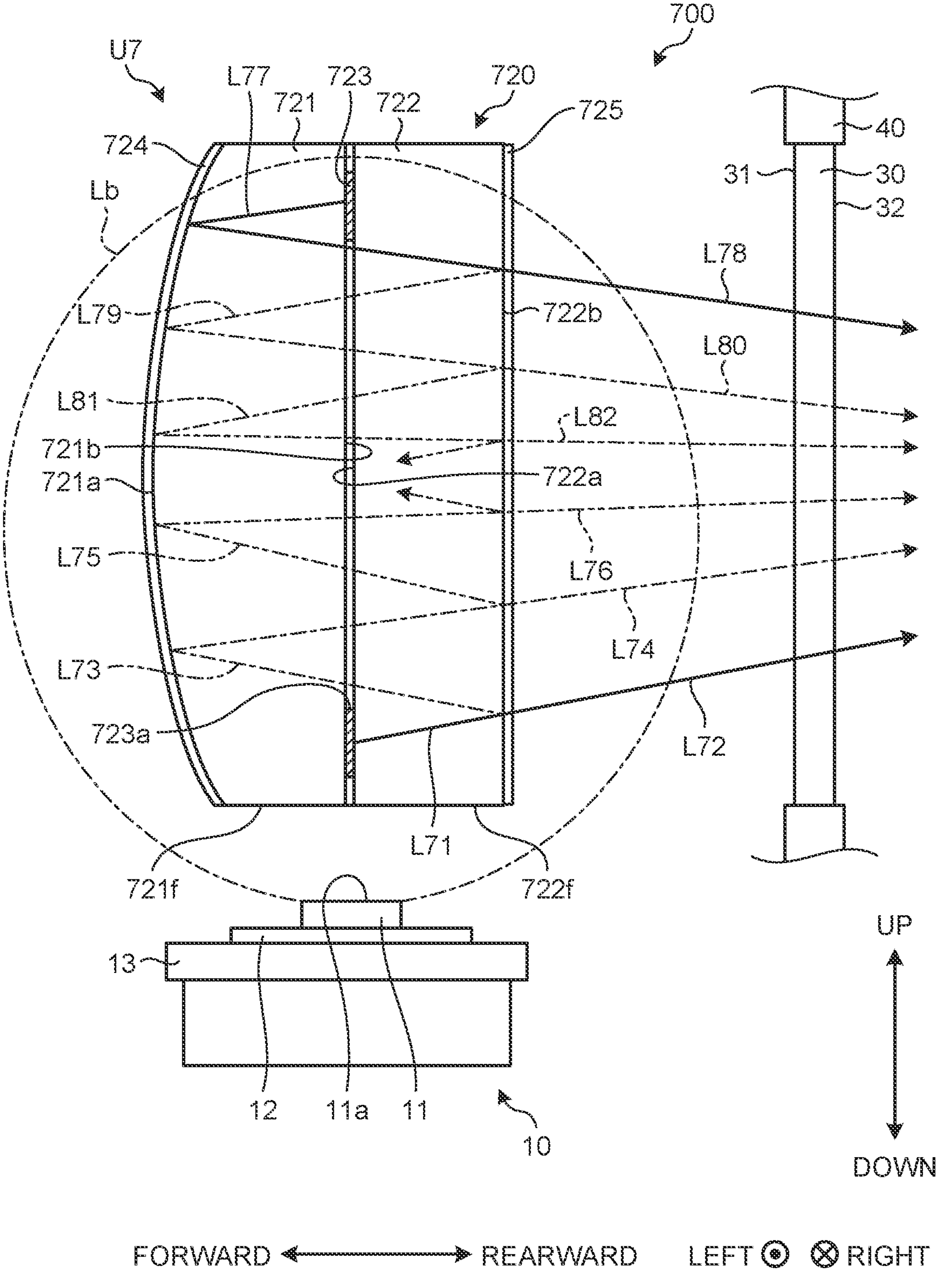
FIG. 14 is a drawing that illustrates example operation of the vehicle lighting system.

Operation of the vehicle lighting system 700 configured as above will now be described. FIG. 14 is a drawing that illustrates example operation of the vehicle lighting system 700. As illustrated in FIG. 14, when the light source 11 is turned on, a part of excitation light Lb emitted from the light-emitting surface 11*a* in the pattern of Lambertian radiation directly illuminates the luminescent layer 723. Another part of the excitation light Lb enters the holding members 721 and 722 through the light-receiving surfaces 721*f* and 722*f*, and illuminates the luminescent layer 723 by being guided through the holding members 721 and 722.

Upon irradiation with the excitation light Lb, the luminescent layer 723 is excited to generate red light L71. Red light L71 generated in the luminescent layer 723 is partially emitted toward the rearward side and reaches the semi-transmissive reflective layer 725 after passing the holding member 722. Red light L72 as a part of the red light L71 passes through the semi-transmissive reflective layer 725 and is output toward the rearward side. Red light L73 as another part of the red light L71 is reflected by the semi-transmissive reflective layer 725 toward the forward side. The red light L73 reflected toward the forward side reaches the reflective layer 724 through the aperture 723*a* and is reflected toward the rearward side by the reflective layer 724. The red light L73 reflected by the reflective layer 724 passes through the aperture 723*a* and again reaches the semi-transmissive reflective layer 725. Since the reflective layer 724 of this embodiment is curvedly projecting toward the forward side, the red light L73 reflected by the reflective layer 724 reaches an inner area of the semi-transmissive reflective layer 725 than the area the red light L71 reaches. Red light L74 as a part of the red light L73 passes through the semi-transmissive reflective layer 725 and is output toward the rearward side. Red light L75 as another part of the red light L73 is reflected toward the forward side by the semi-transmissive reflective layer 725. The red light L75 reaches the reflective layer 724 through the aperture 723*a* and is reflected by the reflective layer 724 toward the rearward side. The red light L75 reflected by the reflective layer 724 reaches an inner area of the semi-transmissive reflective layer 725 than the area the red light L73 reaches. Red light L76 as a part of the red light L75 passes through the semi-transmissive reflective layer 725 and is output toward the rearward side. Another part of the red light L75 is reflected by the semi-transmissive reflective layer 725 toward the forward side. In this manner, red light emitted from the luminescent layer 723 toward the rearward is multiply reflected between the reflective layer 724 and the semi-transmissive reflective layer 725, and is partially output toward the rearward side through the semi-transmissive reflective layer 725.

Red light L77 as a part of the red light generated in the luminescent layer 723 is emitted toward the forward side and reaches the reflective layer 724 after passing the holding member 721. The red light L77 is then reflected toward the rearward side by the reflective layer 724, and reaches the semi-transmissive reflective layer 725 through the aperture 723*a*. Red light L78 as a part of the red light L77 passes through the semi-transmissive reflective layer 725 and is output toward the rearward side. Red light L79 as another part of the red light L77 is reflected toward the forward side by the semi-transmissive reflective layer 725. The red light L79 reflected toward the forward side reaches the reflective layer 724 through the aperture 723*a* and is reflected by the reflective layer 724 toward the rearward side. The red light L79 reflected by the reflective layer 724 passes through the aperture 723*a* and reaches an inner area of the semi-transmissive reflective layer 725 than the area the red light L77 reaches. Red light L80 as a part of the red light L79 passes through the semi-transmissive reflective layer 725 and is output toward the rearward side. Red light L81 as another part of the red light L79 is reflected toward the forward side by the semi-transmissive reflective layer 725. The red light L81 reaches the reflective layer 724 through the aperture 723*a* and is reflected toward the rearward side by the reflective layer 724. The red light L81 reflected by the reflective layer 724 passes through the aperture 723*a* and reaches an inner area of the semi-transmissive reflective layer 725 than the area the red light L79 reaches. Red light L82 as a part of the red light L81 passes through the semi-transmissive reflective layer 725 and is output toward the rearward side. Another part of the red light L81 is reflected toward the forward side by the semi-transmissive reflective layer 725. In this manner, similarly, red light output from the luminescent layer 723 toward the forward side is multiply reflected between the reflective layer 724 and the semi-transmissive reflective layer 725, and is partially output toward the rearward side through the semi-transmissive reflective layer 725.

For easy understanding of the drawing, in FIG. 14, the red light L71 and red lights L72 to L76, derived from the red light L71, output toward the rearward side are illustrated in the lower part of the luminescent layer 723. The red light L77 and red lights L78 to L82, derived from the red light L77, output toward the forward side are illustrated in the upper part of the luminescent layer 723.

Figure 15:
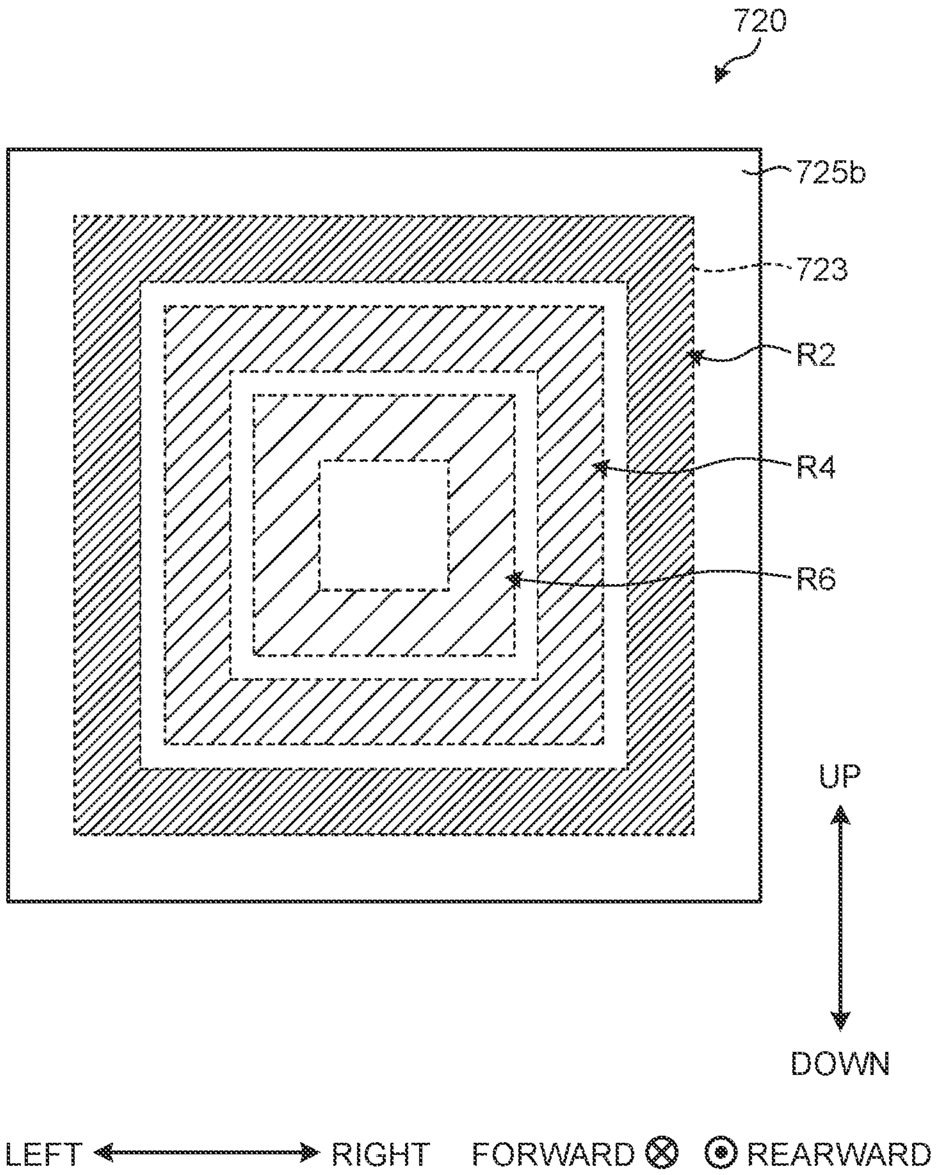
FIG. 15 is a drawing of the example light source unit viewed from the front.

FIG. 15 is a drawing of the example light source unit U7 when viewed from the front. For example, as illustrated in FIG. 15, the red lights L72 and L78 passing through the semi-transmissive reflective layer 725 form a rectangular frame-shaped luminescent region R2. The red lights L74 and L80 passing through the semi-transmissive reflective layer 725 form a rectangular frame-shaped luminescent region R4 inside the above luminescent region R2. Likewise, the red lights L76 and L82 passing through the semi-transmissive reflective layer 725 form a rectangular frame-shaped luminescent region R6 inside the above luminescent region R4.

The red lights L72 and L78 to be output from the luminescent region R2 undergo a small number of multiple reflections and thus have a short optical path, compared to the red lights to be output from other luminescent regions R4 and R6. The red lights L74 and L80 to be output from the luminescent region R4 have longer optical paths than those of the red lights L72 and L78 from the luminescent region R2, and have shorter optical paths than those of the red lights L76 and L82 from the luminescent region R6. The red lights L76 and L82 to be output from the luminescent region R6 have longer optical paths than those of the red lights from other luminescent regions R2 and R4. This structure allows the viewer to see as if red light from the outer luminescent region R2, of the three different luminescent regions R2, R4, and R6, was shining at the front, and the red light from the middle luminescent region R4 shining in the middle, and the red light from the inner luminescent region R6 shining at the back.

As described above, the light source unit U7 according to this embodiment includes: the light source assembly 10 that emits the excitation light Lb; the light generating unit 720 that includes the luminescent layer 723 configured to emit red light, which is generation light, by being irradiated with the excitation light Lb, the reflective layer 724 disposed on a back side of the luminescent layer 723 and configured to reflect red light toward the rearward side, the semi-transmissive reflective layer 725 disposed at a location that is on the front side of the luminescent layer 723 and is opposite to the reflective layer 724 with the luminescent layer 723 interposed therebetween and configured to transmit a part of the red light and to reflect another part of the red light toward the forward side, and the holding members 721 and 722 holding the luminescent layer 723, the reflective layer 724, and the semi-transmissive reflective layer 725; and the lens member 30 that is disposed on the front side of the light generating unit 720 and outputs the red light, which is the generation light, passing through the semi-transmissive reflective layer 725 of the light generating unit 720 toward the rearward side.

According to this configuration, the luminescent layer 723 is configured to emit red light, as generation light, by being irradiated with excitation light from the light source 11. This configuration reduces electrical deterioration which may occur in an organic light-emitting diode. The light source unit U7 capable of surface emitting while securing reliability of the light source 11 is therefore obtained at a low cost. Red light generated in the luminescent layer 723 is multiply reflected between the reflective layer 724 and the semi-transmissive reflective layer 725. A part of the red light passes through the semi-transmissive reflective layer 725 and is output from the lens member 30. The lens member 30 outputs red lights the optical paths of which are different in length depending on the number of multiple reflections. This configuration can provide the viewer with a sense of depth in the illumination design.

The light source unit U7 according to this embodiment has the luminescent layer 723 formed of an organic material. This composition is effective in creating surface emitting, and allows the luminescent layer to be kept transparent unless otherwise irradiated with excitation light.

The luminescent layer 723 of the light source unit U7 according to this embodiment is in the form of a frame when viewed from the rearward (from the front). This shape allows red light reflected by the semi-transmissive reflective layer 725 to pass through the aperture of the frame and to easily reach the reflective layer 724. Red light reflected by the reflective layer 724 similarly passes through the aperture of the frame and easily reaches the semi-transmissive reflective layer 725. This structure therefore achieves effective use of the red light.

The light source unit U7 according to this embodiment has the light source assembly 10 disposed under the luminescent layer 723 with the light source unit U7 mounted on the vehicle. This arrangement enables efficient irradiation of the luminescent layer 723 with the excitation light Lb.

The light source unit U7 according to the different embodiment has the reflective layer 724 curvedly projecting toward the forward side. This structure allows the red light to be inwardly reflected. Since the luminescent layer 723 is exemplarily in the shape of a frame as described in this embodiment, the light source unit U7 is recognized by a viewer, viewing the light source unit U7 from the rearward side, as if a plurality of frame-shaped luminescent regions R2, R4, and R6 were located at respective different depths (in the forward-rearward direction) from the outside toward the inside.

In the light source unit U7 according to this embodiment, each of the holding members 721 and 722 has side surfaces that connect the flat portions at the front and the back with each other. The light source assembly 10 may have the light-emitting surface 11*a* to emit the excitation light Lb facing one of the side surfaces. This structure allows the excitation light to enter the holding members 721 and 722 through the side surfaces thereof, and to illuminate the luminescent layer 723 by being guided throughout the inside of the holding members 721 and 722. This structure therefore achieves efficient irradiation of the luminescent layer 723 with the excitation light.

In the light source unit U7 according to this embodiment, the luminescent layer 723 emits red light, as generation light. Surface emitting using red light is therefore easily obtained for use of tail lights or similar devices.

In the light source unit U7 according to this embodiment, the lens member 30 transmits red light and absorbs light different from the red light. The lens member 30 thus can absorb elements of excitation light contained in outside light. This structure can prevent the luminescent layer 723 from emitting light while the light source 11 is off.

The vehicle lighting system 700 according to this embodiment includes the above light source unit U7. Since the vehicle lighting system 700 includes the light source unit U7 capable of providing surface emitting while securing reliability of the light source 11 and reducing the cost, the vehicle lighting system 700 achieves low-cost and stable surface emitting. Since the vehicle lighting system 700 includes the light source unit U7 capable of providing a viewer with a sense of depth in the illumination design, the vehicle lighting system 700 has enhanced visibility.

The scope of technology of the present invention is not limited to the above-described embodiments. Various changes can be made as appropriate without departing from the spirit of the present invention. For example, the above embodiment describes the luminescent layer 723 as a frame-shaped structure when viewed from the front. Without being limited thereto, the luminescent layer 723 may be rectangular, polygonal, circular, elliptical, or in a similar shape.

The above embodiment describes a structure in which the luminescent layer 723 has the aperture 723*a* in the middle thereof when viewed from the front. Without being limited thereto, another structure may also be effective if there is a portion that allows transmission of light during multiple reflection between the reflective layer 724 and the semi-transmissive reflective layer 725. For example, when viewed from the front, the luminescent layer 723 may be located in a certain area of the holding members 721 and 722, such as the center portion, the upper half portion, the lower half portion, the left half portion, and the right half portion.

In the above embodiment, the reflective layer 724 exemplarily projects toward the back side from the outer periphery to the center of the holding member 721. The structure is not limited thereto. For example, the reflective layer 724 may project toward the back side from an end to the other end of the holding member 721 in at least one of the up-down direction and the left-right direction.

Figure 16:
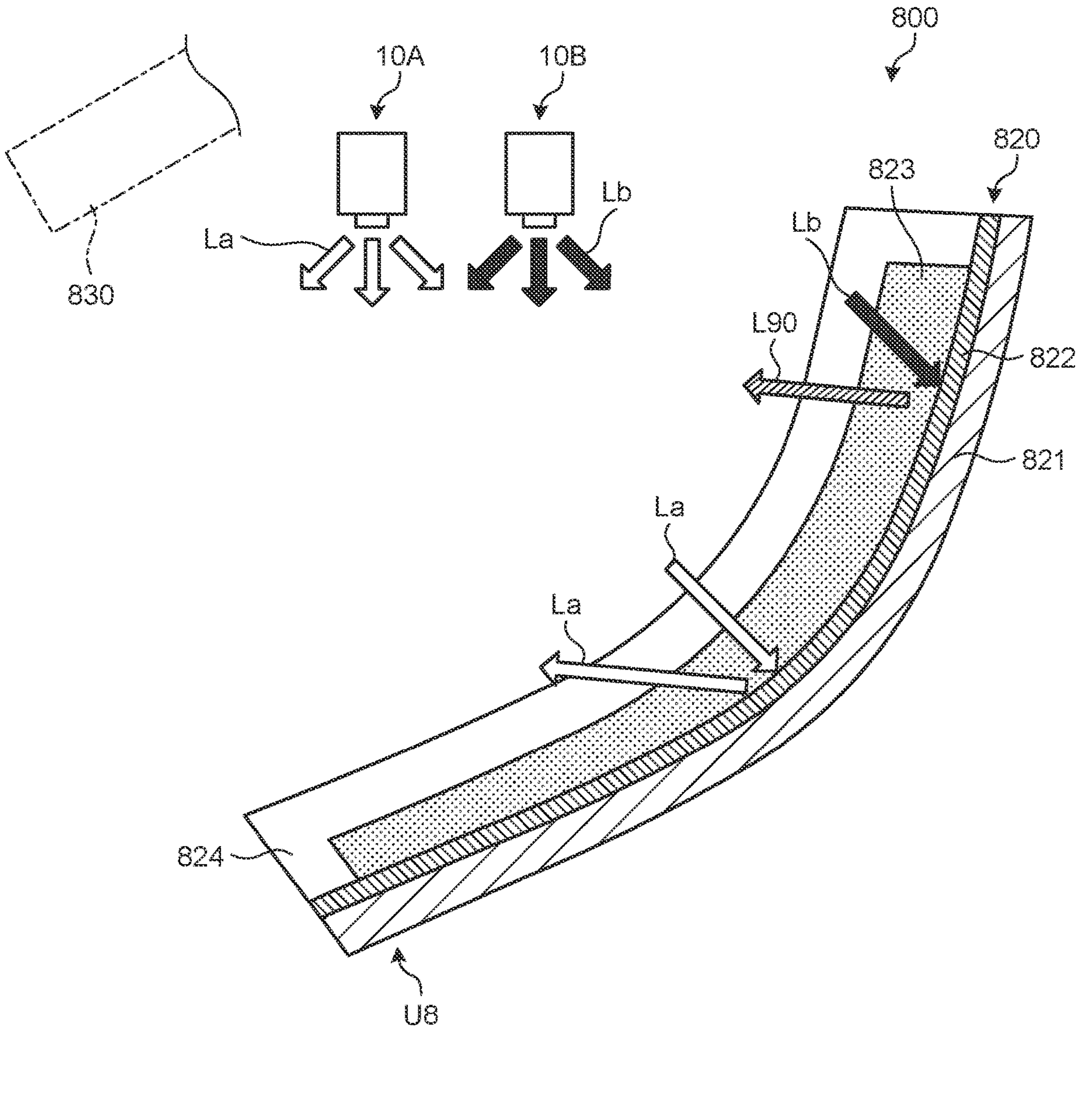
FIG. 16 is a drawing of an example vehicle lighting system according to a modification.

In the above embodiments, a holding member that holds a light generating unit is exemplarily capable of transmitting red light generated by the light generating unit. The structure is, however, not limited thereto. FIG. 16 is a drawing of an example vehicle lighting system 800 according to a modification. As illustrated in FIG. 16, the vehicle lighting system 800 includes a light source unit U8 including light source assemblies 10A and 10B, a light generating unit 820, and a lens member 830, and an inner panel (not illustrated). The light source assembly 10A is a light source that emits white light La. The light source assembly 10B is a light source that emits, for example, ultraviolet as the excitation light Lb.

The light generating unit 820 includes a holding member 821, a light reflective film 822, a luminescent layer 823, and a sealer 824. The holding member 821 is, for example, in the form of a plate. The holding member 821 may be made of, for example, a thermoplastic material such as polycarbonate, glass, and acrylic resin. The holding member 821 may be a rigid substrate or a flexible substrate. The holding member 821 may be an optically non-transmissive member.

The light reflective film 822 is formed on the surface of the holding member 821 and reflects light emitted from the light sources 10A and 10B. The light reflective film 822 is made of a metallic material, such as aluminum, silver, and an alloy of these materials. The luminescent layer 823 is formed on the light reflective film 822. The luminescent layer 823 is excited by being irradiated with the excitation light Lb from the light source assembly 10B and generates generation light. The luminescent layer 823 transmits the white light La emitted from the light source assembly 10A. As with the above embodiments, the luminescent layer 823 is made using, for example, 4,4'-bis(carbazoyl)biphenyl (CBP) as a host material, and, for example, Btp2Ir(acac) bis(2-(2'-benzo[4,5-a]thienyl) pyridinato-N, C3')iridium (acetylacetonate) as a guest material. The luminescent layer 823 made as above emits red light L90 as the generation light. The host material and the dopant are not limited to the above materials. The luminescent layer 823 may use an inorganic material, such as yttrium aluminum garnet (YAG).

The sealer 824 transmits the excitation light Lb and the red light L90 and seals the luminescent layer 823. The sealer 824 may be made of a resin material, such as silicone resin, or an inorganic material such as $SiO_2$.

In the above vehicle lighting system 800, the white light La emitted from the light source assembly 10A passes through the sealer 824 and the luminescent layer 823 and reaches the light reflective film 822 and is reflected by the light reflective film 822. The reflected white light La passes the luminescent layer 823 and the sealer 824 and the lens member 830, and goes out. In this manner, substantially all the white light La emitted from the light source assembly 10A goes out without being absorbed.

The excitation light Lb emitted from the light source assembly 10B passes the sealer 824 and reaches the luminescent layer 823 and is absorbed by the luminescent layer 823. The luminescent layer 823 generates the red light L90 by absorbing the excitation light Lb. A part of the generated red light L90 immediately passes the sealer 824 and reaches the lens member 830. Another part of the generated red light L90 proceeds toward the light reflective film 822 and is reflected by the light reflective film 822. The reflected red light L90 passes the luminescent layer 823 and the sealer 824 and reaches the lens member 830. The red light L90 reaches the lens 830 and goes out through the lens member 830.

The above vehicle lighting system 800 can be used, for example, as a back light if the light source assembly 10A is configured to emit the white light La. The vehicle lighting system 800 can be used as a part of rear lighting system or accessory lights if the light source assembly 10B is configured to emit ultraviolet Lb.

In the above embodiments, the luminescent layers 22, 222, 322, 425, 427, 429, 723, and 823 may be formed on a transparent sheet, such as a polyethylene terephthalate (PET) sheet. The excitation light Lb from the light source may be configured to directly illuminate the luminescent layer.

In the above embodiments, the luminescent layers 22, 222, 322, 425, 427, 429, 723, and 823 may be provided to an optical member, such as an inner lens, that controls light from the light source. In this case, the luminescent layer is irradiated with the excitation light Lb, the distribution of which is controlled by the optical member.

REFERENCE SIGNS LIST

L1, L2, L71 to L82, L90 RED LIGHT
La WHITE LIGHT
Lb EXCITATION LIGHT
R2, R4, R6 LUMINESCENT REGION
U1, U2, U3, U4, U5, U6, U7, U8 LIGHT SOURCE UNIT
10, 10A, 10B LIGHT SOURCE ASSEMBLY
11 LIGHT SOURCE
11*a* LIGHT-EMITTING SURFACE
12 SUPPORT SUBSTRATE
13, 14 HEAT SINK
20, 120, 220, 320, 420, 520, 820 LIGHT GENERATING UNIT
21, 121, 221, 321, 424, 426, 428, 721, 722, 821 HOLDING MEMBER
21*a*, 21*b*, 424*a*, 426*a*, 426*b*, 428*a*, 428*b*, 721*b*, 722*a*, 722*b* FLAT PORTION
21*f*, 31, 41, 721*f*, 722*f* LIGHT-RECEIVING SURFACE
22, 22*a*, 22*b*, 222, 322, 425, 427, 429, 723, 823 LUMINESCENT LAYER
22R, 425R, 427R, 429R LUMINESCENT REGION
23, 430, 726, 824 SEALER
30, 830 LENS MEMBER
32, 42 LIGHT-OUTPUT SURFACE
40 INNER PANEL
60 REFLECTOR
61 REFLECTIVE SURFACE
100, 600, 700, 800 VEHICLE LIGHTING SYSTEM
121*s* LIGHT DIFFUSING PORTION
323 SEALER
421 FIRST LIGHT GENERATING UNIT
422 SECOND LIGHT GENERATING UNIT
423 THIRD LIGHT GENERATING UNIT
721*a* CURVED PORTION
723*a* APERTURE
724 REFLECTIVE LAYER
725 SEMI-TRANSMISSIVE REFLECTIVE LAYER
822 LIGHT REFLECTIVE FILM

The invention claimed is:

1. A light source unit of a vehicle lighting system, the light source unit comprising:

a light source that emits blue excitation light;

a light generating unit that includes a luminescent layer to emit red generation light by being irradiated with the blue excitation light, a flexible holding member that holds the luminescent layer and a flexible sealer for sealing the luminescent layer, and generates the red generation light that is obtained by surface emitting of a luminescent surface of the luminescent layer; and a lens member that outputs the red generation light generated by the light generating unit toward a front, the lens member transmitting red light and absorbing list which is different from red light, wherein the light source is disposed under the light generating unit and the lens member in a vertical direction, and the flexible sealer transmits the blue excitation light and the red generation light.

2. The light source unit of a vehicle lighting system according to claim 1, wherein the luminescent layer is made of an inorganic material.

3. The light source unit of a vehicle lighting system according to claim 1, wherein the luminescent layer is made of an organic material.

4. A light source unit of a vehicle lighting system, the light source unit comprising:

a light source that emits blue excitation light;

a light generating unit that includes a luminescent layer to emit red generation light by being irradiated with the blue excitation light, a flexible holding member that holds the luminescent layer and a flexible sealer for sealing the luminescent layer, and generates the red generation light that is obtained by surface emitting of a luminescent surface of the luminescent layer; and a lens member that outputs the red generation light generated by the hot generating unit toward a front, the lens member transmitting red light and absorbing light which is different from red light, wherein the light generating unit includes a reflective layer that reflects the red generation light toward a front, and the flexible sealer transmits the blue excitation light and the red generation light.

5. The light source unit of a vehicle lighting system according to claim 4, wherein the luminescent layer is made of an inorganic material.

6. The light source unit of a vehicle lighting system according to claim 4, wherein the luminescent layer is made of an organic material.

7. A light source unit of a vehicle lighting system, the light source unit comprising:

a light source that emits blue excitation light;

a light generating unit that includes a luminescent layer to emit red generation light by being irradiated with the blue excitation light, a flexible holding member that holds the luminescent layer and a flexible sealer for sealing the luminescent layer, and generates the red generation light that is obtained by surface emitting of a luminescent surface of the luminescent layer;

a lens member that outputs the red generation light generated by the light generating unit toward a front, the lens member transmitting red light and absorbing light which is different from red light; and a heat sink that supports the light source, wherein the flexible sealer transmits the blue excitation light and the red generation light.

8. The light source unit of a vehicle lighting system according to claim 7, wherein the luminescent layer is made of an inorganic material.

9. The light source unit of a vehicle lighting system according to claim 7, wherein the luminescent layer is made of an organic material.

10. A light source unit of a vehicle lighting system, the light source unit comprising:

a light source that emits blue excitation light;

a light generating unit that includes a luminescent layer to emit red generation light by being irradiated with the blue excitation light, a flexible holding member that holds the luminescent layer and a flexible sealer for sealing the luminescent layer, and generates the red generation light that is obtained by surface emitting of a luminescent surface of the luminescent layer;

a lens member that outputs the red generation light generated by the light generating unit toward a front, the lens member transmitting red light and absorbing light which is different from red light; and a reflector having a reflective surface that reflects the blue excitation light emitted from the light source toward the light generating unit, wherein the flexible sealer transmits the blue excitation light and the red generation light.

11. The light source unit of a vehicle lighting system according to claim 10, wherein the luminescent layer is made of an inorganic material.

12. The light source unit of a vehicle lighting system according to claim 10, wherein the luminescent layer is made of an organic material.

* * * * *